United States Patent
Wacker

(10) Patent No.: US 9,726,392 B2
(45) Date of Patent: Aug. 8, 2017

(54) GENERIC USER INTERFACE SYSTEM

(75) Inventor: Paul C. Wacker, Plymouth, MN (US)

(73) Assignee: Honeywell International Inc., Morris Plains, NJ (US)

(*) Notice: Subject to any disclaimer, the term of this patent is extended or adjusted under 35 U.S.C. 154(b) by 892 days.

(21) Appl. No.: 11/747,657

(22) Filed: May 11, 2007

(65) Prior Publication Data

US 2008/0004725 A1    Jan. 3, 2008

Related U.S. Application Data

(63) Continuation-in-part of application No. 11/670,911, filed on Feb. 2, 2007, and a continuation-in-part of application No. 11/620,431, filed on Jan. 5, 2007, and a continuation-in-part of application No. 11/564,797, filed on Nov. 29, 2006, and a continuation-in-part of application No. 11/427,750, filed on Jun. 29, 2006.

(51) Int. Cl.
*F24F 11/00*    (2006.01)

(52) U.S. Cl.
CPC ... *F24F 11/0009* (2013.01); *F24F 2011/0061* (2013.01); *G05B 2219/23258* (2013.01); *G05B 2219/25257* (2013.01); *G05B 2219/25265* (2013.01); *G05B 2219/2614* (2013.01)

(58) Field of Classification Search
None
See application file for complete search history.

(56) References Cited

U.S. PATENT DOCUMENTS

| | | | |
|---|---|---|---|
| 4,654,653 A | 3/1987 | Brindle et al. | |
| 4,723,513 A | 2/1988 | Vallett et al. | |
| 4,784,580 A | 11/1988 | Takata et al. | |
| 4,793,800 A | 12/1988 | Vallett et al. | |
| 5,449,319 A | 9/1995 | Dushane et al. | |
| 5,479,812 A | 1/1996 | Juntunen et al. | |
| 5,481,741 A * | 1/1996 | McKaskle | G06F 3/0481 345/522 |
| 5,576,946 A * | 11/1996 | Bender | G05B 19/41865 700/17 |
| 5,605,280 A | 2/1997 | Hartman | |

(Continued)

OTHER PUBLICATIONS

Echelon, "ShortStack Developer's Kit Model 23400," 3 pages, 2002.

(Continued)

*Primary Examiner* — Christopher E Everett
(74) *Attorney, Agent, or Firm* — Seager, Tufte & Wickhem, LLP

(57) ABSTRACT

A generic user interface for rapid application development on a stand-alone control platform. A user interface may be designed using generic menu methodology consisting of predefined tables, fonts, and templates, such that table entries and menu selections are made based on the platform. An example platform may be designed from function blocks from a function block engine. An application may be developed to run on the control platform (within the constraints of the hardware and function block engine), and a corresponding user interface may be automatically generated by populating the generic tables of the user interface methodology based on simple user input during placement of the function blocks, as an example.

14 Claims, 27 Drawing Sheets

(56) References Cited

U.S. PATENT DOCUMENTS

| | | | |
|---|---|---|---|
| 5,778,368 A | 7/1998 | Hogan et al. | |
| 5,801,942 A * | 9/1998 | Nixon et al. | 700/83 |
| 5,989,020 A | 11/1999 | Glass et al. | |
| 6,008,805 A | 12/1999 | Land et al. | |
| 6,084,585 A * | 7/2000 | Kraft et al. | 715/733 |
| 6,157,943 A * | 12/2000 | Meyer | 709/203 |
| 6,240,358 B1 * | 5/2001 | Kawai | F02D 41/263 701/114 |
| 6,272,400 B1 | 8/2001 | Jankins et al. | |
| 6,330,806 B1 * | 12/2001 | Beaverson | F24F 11/006 236/51 |
| 6,366,300 B1 * | 4/2002 | Ohara et al. | 715/771 |
| 6,366,994 B1 * | 4/2002 | Kalyur | G06F 12/10 711/129 |
| 6,428,312 B1 | 8/2002 | Smelcer et al. | |
| 6,453,687 B2 | 9/2002 | Sharood et al. | |
| 6,536,678 B2 | 3/2003 | Pouchak | |
| 6,549,826 B1 | 4/2003 | Pouchak et al. | |
| 6,615,404 B1 | 9/2003 | Garfunkel et al. | |
| 6,618,430 B1 * | 9/2003 | Khaleghi et al. | 375/147 |
| 6,619,951 B2 | 9/2003 | Bodnar et al. | |
| 6,687,698 B1 * | 2/2004 | Nixon et al. | 707/10 |
| 6,694,926 B2 | 2/2004 | Baese et al. | |
| 6,745,085 B2 | 6/2004 | Pouchak | |
| 6,754,885 B1 * | 6/2004 | Dardinski et al. | 717/113 |
| 6,832,120 B1 | 12/2004 | Frank et al. | |
| 6,851,621 B1 * | 2/2005 | Wacker et al. | 236/51 |
| 6,867,749 B1 * | 3/2005 | Il et al. | 345/1.1 |
| 6,934,862 B2 | 8/2005 | Sharood et al. | |
| 7,055,759 B2 * | 6/2006 | Wacker et al. | 236/51 |
| 7,089,530 B1 * | 8/2006 | Dardinski et al. | 717/105 |
| 7,120,908 B1 | 10/2006 | Klimchynski | |
| 7,124,163 B2 | 10/2006 | Geofroy et al. | |
| 7,209,870 B2 * | 4/2007 | Simmons et al. | 703/1 |
| 7,272,815 B1 * | 9/2007 | Eldridge et al. | 717/101 |
| 2002/0013629 A1 * | 1/2002 | Nixon | G05B 19/0421 700/4 |
| 2003/0074164 A1 * | 4/2003 | Simmons et al. | 703/1 |
| 2003/0158975 A1 | 8/2003 | Frank et al. | |
| 2003/0159129 A1 | 8/2003 | Frank et al. | |
| 2004/0144849 A1 | 7/2004 | Ahmed | |
| 2004/0199925 A1 * | 10/2004 | Nixon et al. | 719/315 |
| 2004/0238653 A1 | 12/2004 | Alles | |
| 2004/0267515 A1 * | 12/2004 | McDaniel et al. | 703/22 |
| 2005/0055515 A1 * | 3/2005 | Greicar | G06F 9/44521 711/154 |
| 2005/0230490 A1 | 10/2005 | Pouchak et al. | |
| 2006/0025132 A1 * | 2/2006 | Karaoguz et al. | 455/433 |
| 2006/0253205 A1 * | 11/2006 | Gardiner | 700/19 |
| 2006/0277007 A1 * | 12/2006 | Wakelam et al. | 703/1 |
| 2007/0142941 A1 * | 6/2007 | McGreevy et al. | 700/83 |
| 2008/0009956 A1 * | 1/2008 | Pouchak | 700/11 |
| 2009/0113037 A1 * | 4/2009 | Pouchak | 709/224 |

OTHER PUBLICATIONS

Echelon, "Echelon ShortStack Micro Server Answers to Frequently Asked Questions," pp. 1-5, Apr. 2002.
Echelon, "ShortStack Overview," 12 pages, prior to Nov. 29, 2006.
Echelon, "ShortStack User's Guide, Version 2" 152 pages, Mar. 2002.
Honeywell, "T7770A,B,C,D,E,F,G, Wall Modules, Excel 5000 Open System," pp. 1-4, 1997.
"LonMark Functional Profile: VAV Controller (VAV)," pp. 1-19, 1996.

* cited by examiner

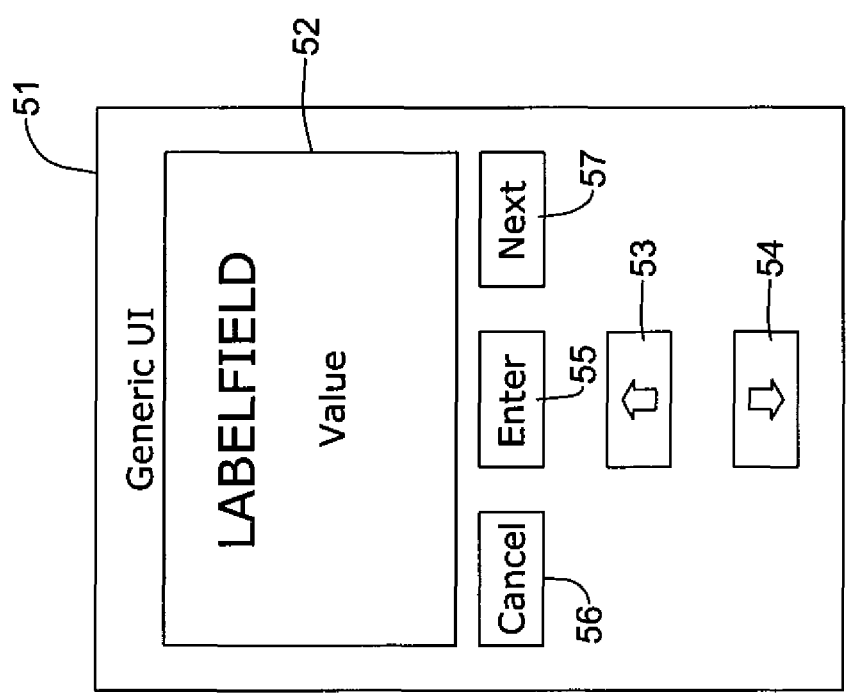

| Default display Table | |
|---|---|
| Category Number | Item Number |
| 1 | 1 |

*Figure 7*

| SimTime | ADD1.y | nvIn3. | Tag1_4. | LIMIT8.y | LIMIT12.y | SQRT8.y | MUL10.y |
|---|---|---|---|---|---|---|---|
| 11 | 17 | 2 | 17 | 10 | 17 | 4.123106 | 8 |
| 21 | 27 | 2 | 27 | 20 | 27 | 5.196152 | 8 |
| 31 | 37 | 2 | 37 | 30 | 37 | 6.082763 | 8 |
| 41 | 47 | 2 | 40 | 40 | 40 | 6.324555 | 8 |
| 51 | 57 | 2 | 40 | 50 | 40 | 6.324555 | 8 |
| 101 | 63 | 2 | 40 | 5 | 40 | 6.324555 | 8 |
| 111 | 17 | 2 | 17 | 10 | 17 | 4.123106 | 8 |
| 121 | 27 | 2 | 27 | 20 | 27 | 5.196152 | 8 |
| 131 | 37 | 2 | 37 | 30 | 37 | 6.082763 | 8 |
| 141 | 47 | 2 | 40 | 40 | 40 | 6.324555 | 8 |
| 151 | 57 | 2 | 40 | 50 | 40 | 6.324555 | 8 |
| 201 | 63 | 2 | 40 | 5 | 40 | 6.324555 | 8 |
| 211 | 17 | 2 | 17 | 10 | 17 | 4.123106 | 8 |
| 221 | 27 | 2 | 27 | 20 | 27 | 5.196152 | 8 |
| 231 | 37 | 2 | 37 | 30 | 37 | 6.082763 | 8 |
| 241 | 47 | 2 | 40 | 40 | 40 | 6.324555 | 8 |

*Figure 16*

GENERIC USER INTERFACE SYSTEM

This application is a continuation-in-part of U.S. patent application Ser. No. 11/670,911, filed Feb. 2, 2007.

This application is a continuation-in-part of U.S. patent application Ser. No. 11/620,431, filed Jan. 5, 2007.

This application is a continuation-in-part of U.S. patent application Ser. No. 11/564,797, filed Nov. 29, 2006.

This application is a continuation-in-part of U.S. patent application Ser. No. 11/427,750, filed Jun. 29, 2006.

U.S. patent application Ser. No. 11/670,911, filed Feb. 2, 2007, is hereby incorporated by reference. U.S. patent application Ser. No. 11/620,431, filed Jan. 5, 2007, is hereby incorporated by reference. U.S. patent application Ser. No. 11/564,797, filed Nov. 29, 2006, is hereby incorporated by reference. U.S. patent application Ser. No. 11/559,706, filed Nov. 14, 2006, is hereby incorporated by reference. U.S. patent application Ser. No. 11/427,750, filed Jun. 29, 2006, is hereby incorporated by reference.

BACKGROUND

The present invention pertains to engines for designing systems, and particularly to designing controller systems. More particularly, the invention pertains to displaying information related to the designed control systems.

SUMMARY

The invention is a user interface for a control platform.

BRIEF DESCRIPTION OF THE DRAWING

FIG. 4 shows a diagram of a simulation for a design in FIG. 1a;

FIG. 6 is a diagram of a generic user interface panel;

FIG. 7 shows a default display table;

FIG. 16 shows a table of data from the simulation of the designed circuit or system of FIGS. 14 and 15;

DESCRIPTION

Often, applications are hard-coded to run on a specific hardware platform. This may require substantial time and effort to develop new (and custom) applications. Other devices may be field programmable meaning that no embedded code is added to make a new application; that is, a user in the field provides a program which has the means to be executed in the hardware. This may work well for networked devices that have separate PC tools to configure them; but for stand-alone devices that contain interfaces (UIs), there needs to be an approach for easily providing a matching UI to allow users to interact with the custom programs that they make.

Figure 1:
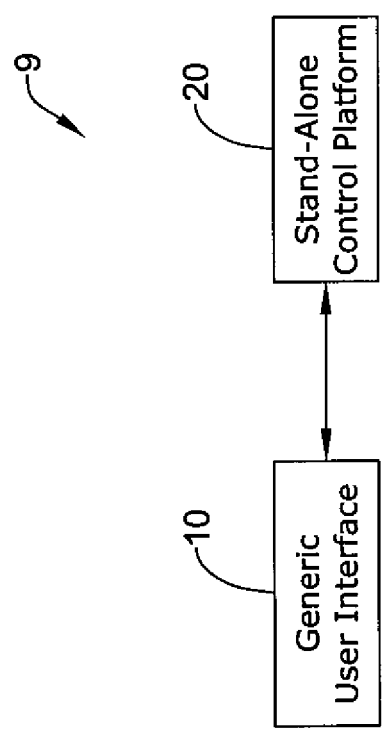
FIG. 1 is a basic diagram of the present system.

The present system 9 of FIG. 1 may provide a configurable, changeable and/or programmable generic user interface 10 for rapid application development on a stand-alone control platform 20. Interface 10 may have particular application in adaptation to a variable platform or to different platforms. If an approach for programmability is a graphical placement of predefined "function blocks", which may result in a stand-alone control platform 20, the user interface 10 may be designed to use a generic menu methodology, consisting of predefined tables, fonts, and templates, such that table entries and menu selections are made based on the function blocks used to make up the program. An application may be developed to run on the control platform 20 (within the constraints of the hardware and function block engine), and a corresponding user interface may be automatically generated by populating the generic tables of the UI methodology based on simple user input during placement of the function blocks, using a generic user interface 10 approach.

An illustrative example of a stand-alone platform 20 may be a function block system. The present generic user interface 10 may used for rapid application on the function block system. However, the present user interface 10 may be used in conjunction with other kinds of stand-alone platforms 20, such as platforms not being, having or utilizing a function block system. Platform 20 may be designed for building environment control, heating, ventilation and air conditioning (HVAC) systems, and/or various industrial operations such as production, refining, and so forth.

The controller system 9 may have the control platform 20 and the user interface 10 connected to the control platform, where the user interface has a display box that is accessible, and the display box has a first level of one or more icons that displays information about one or more parameters and/or variables of the system. The one or more icons may have a second level of one or more icons that provides for selecting and/or adjusting properties of the one or more parameters and/or variables. The icons or symbols may be of a graphical or display nature. To facilitate such selection and adjusting, a five-button panel, described herein as an example (FIG. 6), a dialogue box or other panel 51 may be a part of the interface 10.

The control platform 20 may have one or more function blocks interconnected and the user interface 10 may display information specific to the one or more function blocks. The function blocks may be or represented by symbols or icons of a graphical or display nature. Further, the one or more function blocks may have a display box that is accessible or which may be pulled up with a mouse click on a corresponding function block icon. The display box may have a first level of one or more icons that displays information about one or more parameters and/or variables. The one or more icons may have a second level of one or more icons that provides for selecting and/or adjusting properties of the one or more parameters and/or variables. Such selection and/or adjusting may be auto programmed. An example may be easy setting of set points, for instance on a display by an end user, especially in the field for a changed platform.

Figure 1A:
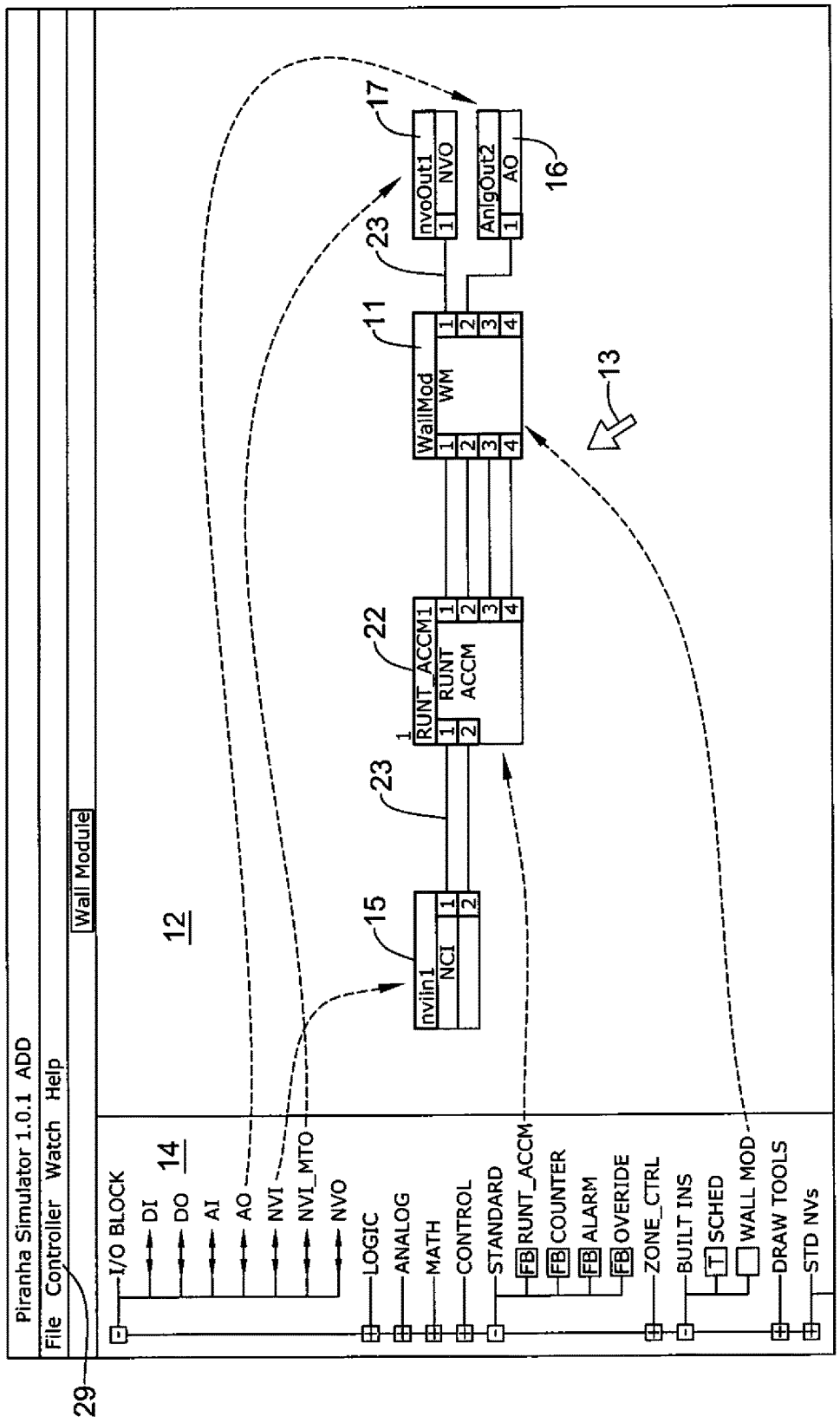
FIG. 1a shows an example of a function block diagram including a wall module function block situated in a display screen area.

FIG. 1a is a diagram that shows a platform example of a function block system which may include a wall module function block 11 situated in a display screen area 12. Other function blocks may instead of, or together with, the wall module function block, be used in the present instance of a platform. Other kinds of designs with the present function block system may be exceptionally numerous, covering a wide range of applications.

Relative to the illustrative example, as shown in the FIG. 1a, the controller button 29 of a toolbar may be set to "configure" with a mouse and an arrow 13. Block 11 (WallMod) may be dragged out with the mouse or other mechanism having arrow 13, as shown by a dashed line, from a function block source area 14 into the area 12. A run-time accumulator function block 22 (RUNT_ACCM1) may be dragged from area 14 into area 12. A network variable input block 15 (nvIln1), a network variable output block 17 (nvoOut1) and an analog output block 16 (AnlgOut2) may be dragged out from area 14 into area 12 with a clicked arrow 13 of the mouse. Block 15 may be connected to block 22 by holding the arrow 13 with a mouse click on terminal 1 of block 15 and dragging a line or wire 23 to a terminal 1 of block 22, and then releasing the click. Similarly, terminal 2 of block 15 may be connected to terminal 2 of block 22. Also, the output terminals 1, 2, 3 and 4 of block 22 may be connected to input terminals 1, 2, 3 and 4, respectively, of wall module block 11. An output terminal 1 of block 11 may be connected to an input terminal 1 of the network variable block 17 by holding arrow 13 down with a click on terminal 1 of block 11 an dragging a line or wire 23 to the terminal 1 of block 17. Similarly, terminal 2 of block 11 may be connected to terminal 1 of block 16. The line 23 connections may be made in the direction of the signal. To delete the line or wire 18, one may click on the terminal that the line goes to, and then press delete button on the keyboard.

Figure 2:
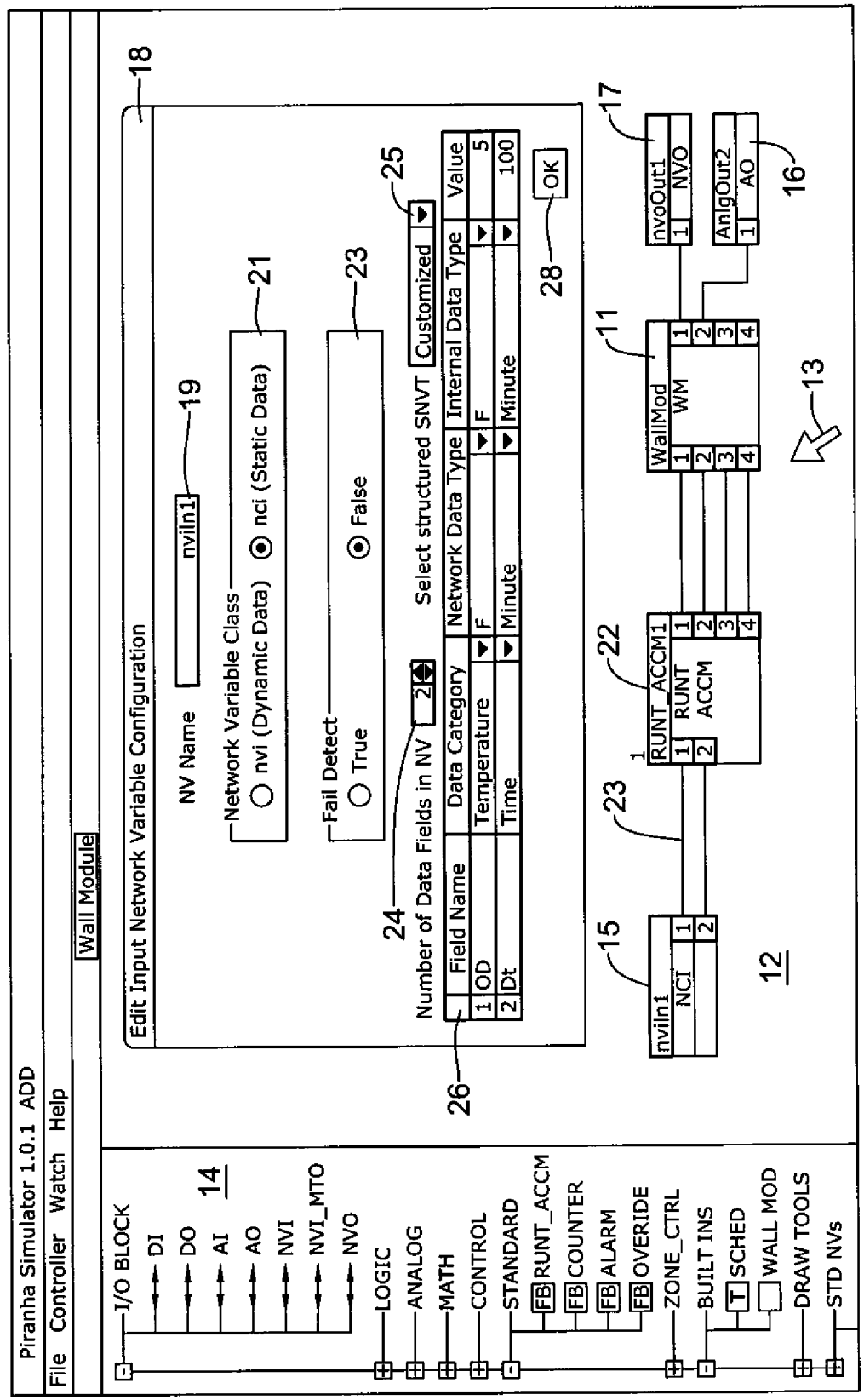
FIG. 2 shows a dialog box of an input block.
Figure 3:
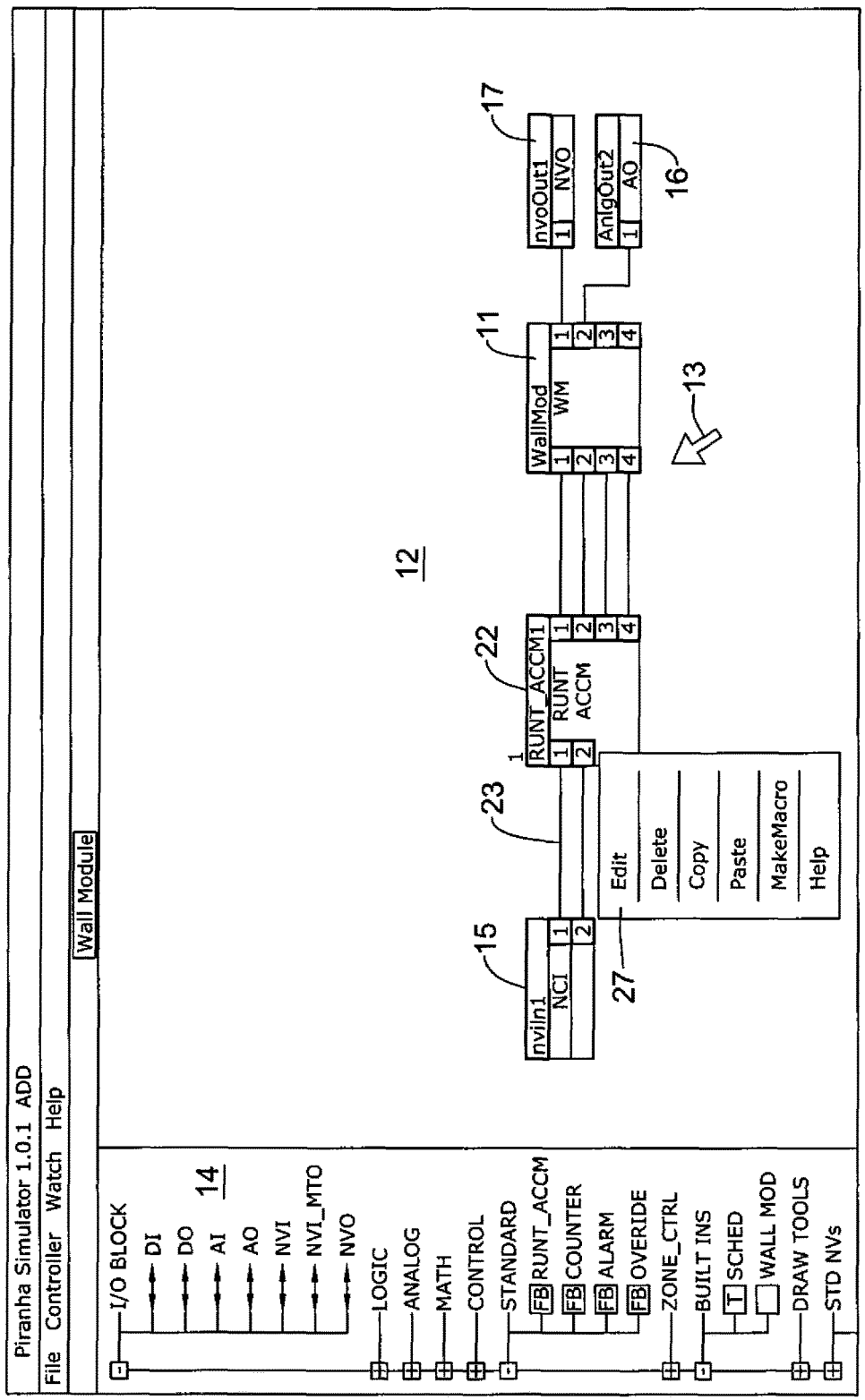
FIG. 3 shows a menu for the input block for getting to the dialog box.

FIG. 2 shows a dialog box 18 of the input block 15. Dialog boxes may exist for the other blocks 11, 22, 16 and 17. One may right click the mouse with the arrow 13 on block 15 to get a menu 27, as shown in FIG. 3. Then one may click on "edit" in the menu to get the dialog box 18. The title of block 15 is shown in a space 19 as "nvIln1", which may be edited by clicking on the space with arrow 13 and then making changes as desired with the keyboard.

In dialog box 18, one may mouse click with arrow 13 on the "Network Variable Class" area 21 and select "nvi (Dynamic Data)" or nci (Static Data)." "nci (Static Data)" may be selected along with "False" in a "Fail Detect" area 23. The "number of data fields in NV" in area 24 may be selected. The number "2" may be selected, although more or less than two may instead be selected. The data fields are shown in area 26, which may list categories of a field name, data category, network data type and a value. Each of these categories may be edited or have a list of items for selection. A structured SNVT may be selected in area 25 from choices of customized, SNVT_switch, SNVT_temp_setpt, SNVT_time_stamp, and so on. Once the desired selections are made in box 18, then an "OK" button 28 may be clicked on with arrow 13 to accept the selections and return to the screen as shown in FIG. 1a.

Figure 4:
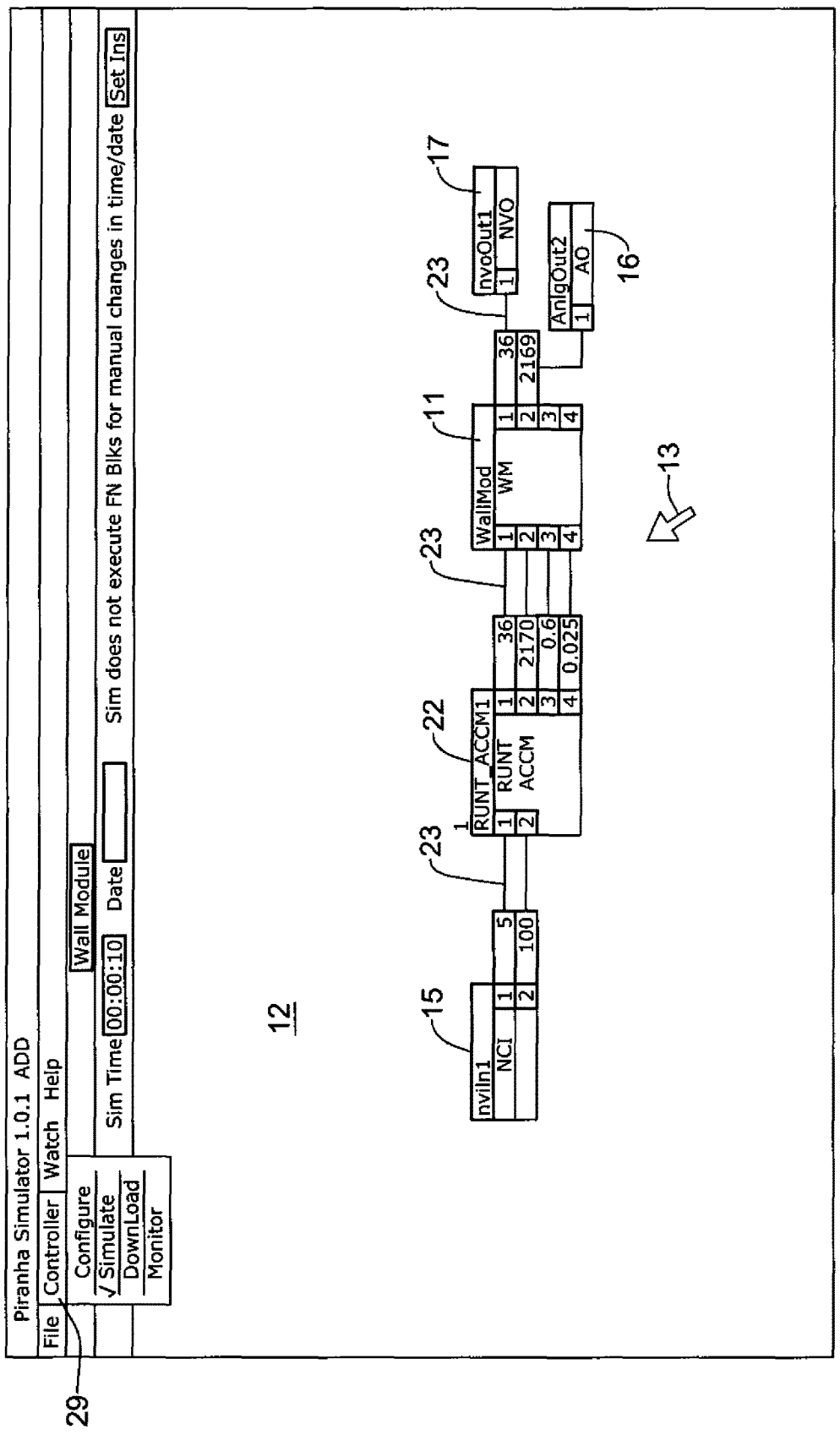

One may select "simulate" from the controller button with arrow 13 to put the circuit of FIG. 1a into a simulated action with signal values shown at outputs on lines 23 of the respective function blocks, as shown in FIG. 4. FIG. 4 shows an instance of a running simulation with certain values changing relative to time. Various circuits of many kinds of function blocks may be constructed with the present system. FIG. 1a is merely an arbitrary instance of a circuit and function which may be successfully simulated in FIG. 4.

Figure 5:
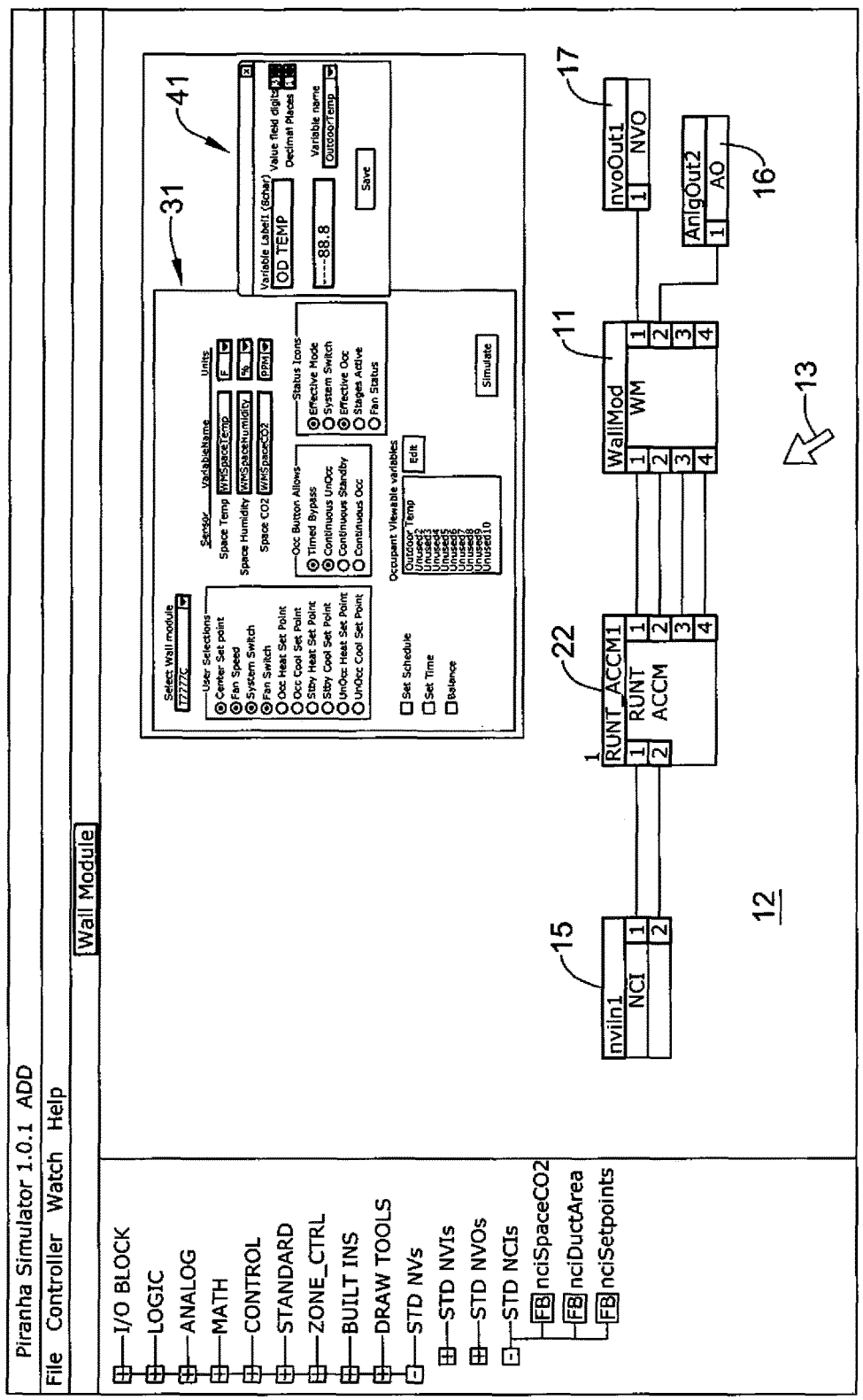
FIG. 5 shows dialog boxes of one of the function blocks.

As in FIG. 2, where a dialog box 18 was pulled for function block 15 to select or change certain items relative to block 15, the same approach may also be applied to function blocks 11, 22, 16 and 17. Another selection and configuring may be made relative to the function block engine and a display of a field, variable, parameter, value, name, and so forth. One may click on, for example, wall module function block 11, with arrow 13 to get a menu like that of menu 27 but for function block 11, with a call-up to show a display edit or a like selection which may result in a dialog box 31 and box 41, as shown in FIG. 5. Boxes 31 and 41 may be regarded as icons of one or more levels. Even a panel 51 of FIG. 6 may be brought up on a function block system screen for doing user interface 10 programming, selection, adjustments, and so forth. The user need not rewrite a program to do a different or customized user interface for a different application or control platform. For instance, new setpoints may be easily implemented as indicated herein. Selections and adjustments of the user interface 10 may be auto programmed for an application at hand rather than manually inserted. On the other hand, the generic user interface 10 may be reconfigured to satisfy the user's personal preferences without being a response to a change in the platform or application.

Figure 5A:
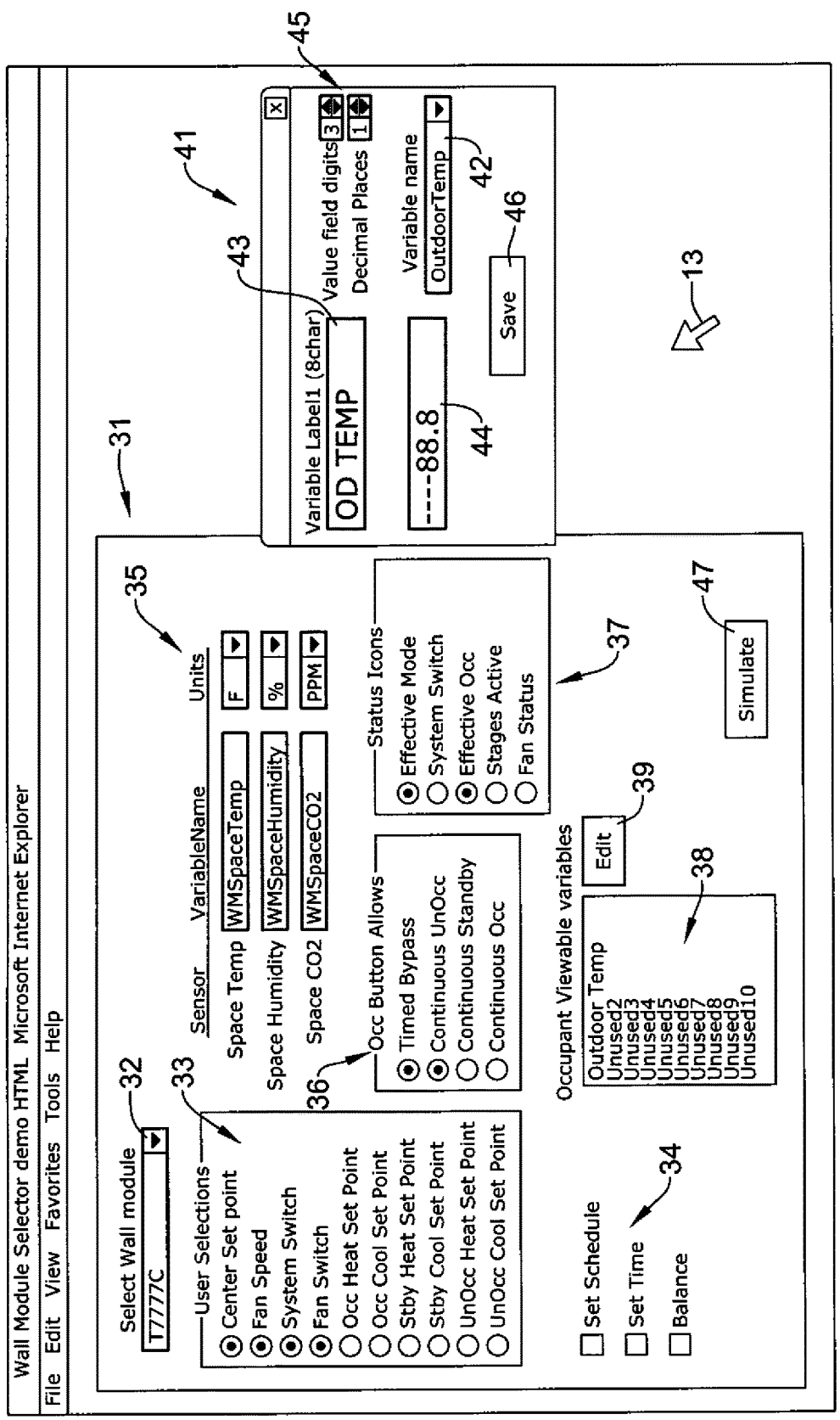
FIG. 5a shows the dialog boxes of FIG. 5 with more detail for configuring a user interface display.

The model of wall module 11 may be selected in area 32 of box 31 in FIG. 5a. User selections may be made in area 33, such as a center set point, fan speed, system switch, fan switch, occupancy (occ) heat set point, occ cool set point, standby (stby) heat set point, stby cool set point, unoccupied (unocc) heat set point, unocc cool set point, and there may be additional user selections. Below area 33 are selections "set schedule", "set time" and "balance", in area 34.

Area 35 of dialogue box 31 in FIG. 5a may show a list of wall module sensors such as space temp, space humidity and space $CO_2$, with a variable name and unit spaces available for selection and editing. Area 36 shows an occupancy button allows for a selection of timed bypass, continuous unocc, continuous standby and continuous occ. An area 37 for status icon selections may include choices of effective mode, system switch, effective occ, stages active and fan status. Areas 33-37 of dialogue box may be designed for more or less selections.

Area 38 reveals a list of occupant viewable variables available for selection for display. The list may be edited with a button 39. A variable "Outdoor Temp" may be selected for viewing. This selection may result in a dialogue box 41 with which a display of one or more parameters or variables may be custom designed with the dialogue box 41. An example may be an outdoor temperature. Space 42 may be for selecting a variable name such as "Outdoor Temp". Another name could be selected. Space or area 43 is a place where a label may be assigned the selected variable of outside or outdoor temperature. An example of a variable label 1 could be "OD TEMP." This label is editable and may have up to 8 characters in the present version. The space 43 may be designed for more or less characters. Area or space 44 may be a label 2 field to reveal the value of an occupant viewable variable such as the selected outdoor temp, which shows 88.8. The field size for area 44 may be up to 7 value digits. The value field digits and decimal places may be selected at space or area 45. Once the editing and selections are done, one may save them with a save button 46 in box 41. Box 41 may be closed. It may be noted that the system may be run with a simulate button in box 31. Other viewable variables may be selected for display. Selections and adjustments may be auto programmed for particular platforms and applications. The wall module approach is one illustrative example of many approaches.

FIG. 6 is a diagram of an example generic user interface five-button panel 51 which may be shown with a computer or other mechanism, such as a function block system. The labels may be read in area 52. The labels may be scrolled through one direction or another with arrows 53 and 54. A label may be selected with an enter button 55. The selection may be canceled with a cancel button 56 or replaced with another label with a next button 57. An example label may include labels 43 and 44 selected for outdoor temperature of box 41 in FIG. 5*a*. Labels for other variables or parameters may be selected as indicated.

A display table may provide labels in a hierarchical manner in terms of categories and items with values, change indications, and maximum and minimum values. Other values and indications may be included for the respective items.

Figure 8:
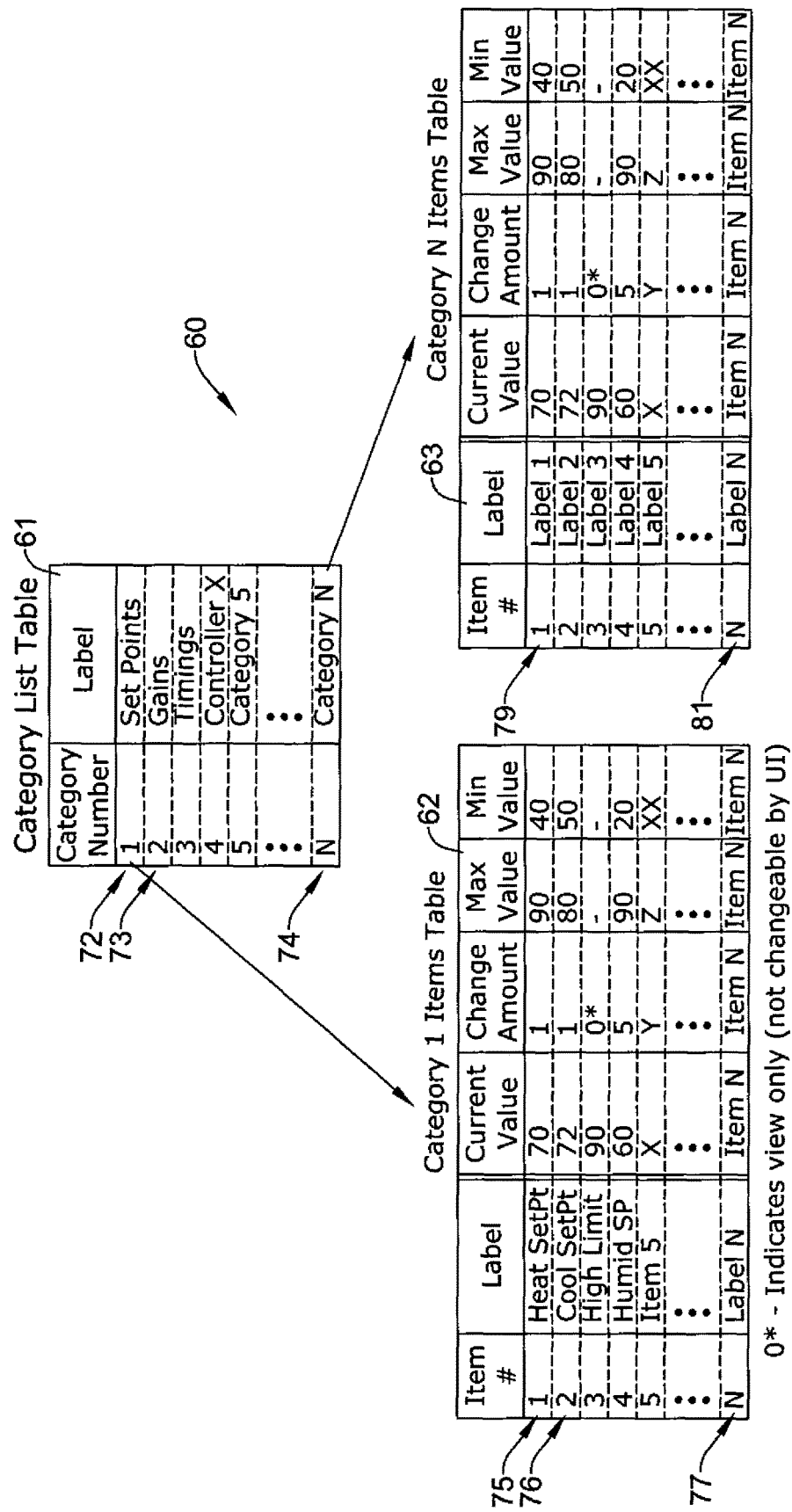
FIG. 8 is a diagram of an extended map of a category list table.

Panel display 51 may show a default display table 58 of FIG. 7 having a category number 1 and an item number 1. FIG. 8 is a diagram of an extended map 60 of a category list table 61 and its expansion to N category tables. Table 61 shows a category number and its corresponding label. Category number 1 may have a label of set points, number 2 may have gains, number 3 may have timings, and so on to category number N.

The display 51, tables 58, 61, 62 and 63, items of certain tables, and/or constituents of the items, tables and the display, may be regarded as or represented by icons of one or more levels.

A "Category 1 Items Table" 62 may list items 1 through N. An example of the first four items may be a heat set point, a cool set point, a high limit and a humidity set point. In each of the category tables (i.e., "Category 2 Items Table" through "Category N Items Table"), a current value, change amount, and maximum and minimum values may be shown for each item of items 1 through N. Other variables and parameters may be shown in the tables. "Category N Items Table" 63 may have the same configuration as the category 1 items table 62. Between tables 62 and 63, there may be N-2 category tables. The items for each table may go from 1 to N with corresponding labels, values and change amounts.

Figure 9:
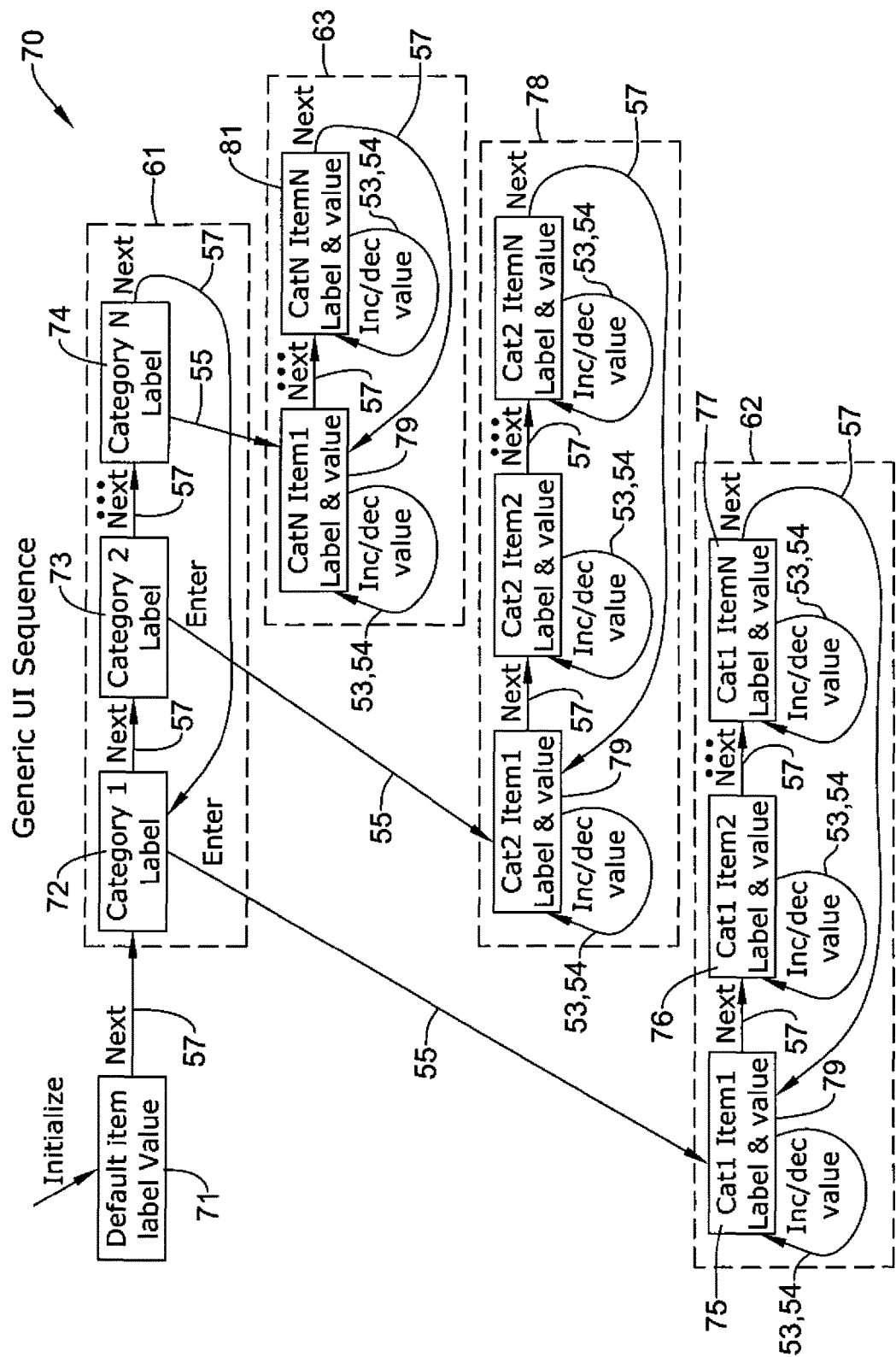
FIG. 9 shows a flow diagram of a generic user interface sequence.

FIG. 9 shows a flow diagram 70 of a generic user interface sequence which may be proceeded on with the generic users interface panel 51. Upon initialization and non-use time out, the display 52 may show a default item label and value 71 based on an entry in the default display table 58. From a default display table 58, one may press the "Next" button or key 57 to get to category list table 61 and cycle through the label field through the entries in table 61, which may include a category number 1 that corresponds to the label "Set Points", a category number 2 that corresponds to the label "Gains", a category number 3 that corresponds to the label "Timings", a category number 4 that corresponds to the label "Controller X", so on through additional categories up to category number N that corresponds to a label "Category N".

Pressing the "Enter" button 55 while on one of the categories of table 61 may bring up the item display with the first term in that category's items table, displaying a label and value of the item. For instance, pressing the "Enter" button 55 while in category number 1 (table 62) may bring up the item display with the first item 75 having the label "Heat SetPt" and the respective current value, change amount, max value and min value. Pressing the "Next" button 57 may bring up the second item 76 display from the current category 1 items (table 62) which may have the label "Cool SetPt" with the respective kinds of values similar to the first item 75. One may continue to proceed through a series of items of category items table 1 (table 62) up to item N (line 77) with its respective values. Pressing the "Next" button 57 again may return the display to item 1 (line 75) of category 1 items table 62.

When in an item, whether of line 75, 76, or 77, or some other line, pressing the increase button 53 and the decrease button 54 may increment or decrement, respectively, the current value for the respective item. Pressing the "Enter" button 55 may save the new current value and return the user to the category display. Pressing the "Cancel" button 56 may restore the current value from the new value to the original value existing upon entering this item display and then go back to the category display.

Returning to the category number 1 label "SetPoints" of line 72 in the category list table 61, one may press the "Next" button 57 for the category number 2 label "Gains" of line 73 and then press the "Enter" button 55 to go to the category 2 items table 78 and proceed through the items, labels and their values as shown herein for table 62. One may return to the category 2 number label "Gains" of line 73 on the display 51 and proceed through other categories on to the category N label "Category N" of line 74 in table 61. The "Enter" button 55 may be pressed or clicked on to bring up the display 51 with the first item 1 of line 79 in table 63 with its label and values. The current value may be increased or decreased with buttons 53 and 54, respectively. The "Next" button 57 may be pressed to move on thorough the next items up to item N of line 81 with its label N and one or more values. Pressing the "Next" button 57 again may return the display to the item 1 of line 79 in table 63. Pressing the "Enter" button 55 or "Cancel" button 56 may return one to the category list table 61 on the display 51. The tables and procedures, as illustrated by example in FIGS. 5-9, may be programmed to be automatic to an extent as desired. For instance, the tables may be set to be auto-fill tables.

With the present system, one may design and/or implement a system controller or another system, including a programmable generic user interface 10, having virtually no hardware except for the computer used to design and put the resulting software into a memory, e.g., in a form of microcode or other manner. An ordinary computer may provided the resulting function block engine designed software input to it, i.e., to a memory, and the computer may effectively become the designed controller with function blocks, interconnections, links, inputs, outputs, selections, adjustments, interfaces, a display, visual and/or audio indicators for showing variables, parameters, readings, prescriptions, results, on-station and/or remote monitoring and control whether by keyboard, mouse, touch screen, voice command, eye tracking and blinking control, or other communicative manner, having diagnostics, simulation capabilities within itself and a system to be controlled, plus more, effectively all in conveyable software. For an illustrative instance, one's home computer may loaded with and use the present system level function block engine to design virtually any kind of system controller in a context of software. After design, simulation and testing, as desired, this computer may become the designed system controller for an actual application, or the software may be transferred to another computer or other device to become the system controller. The computer, or some other like-designed processor, programmable personal assistant (PDA), cell phone, device and so on, with the software may become the designed system controller such as, for one among many examples, a programmable thermostat for a building HVAC. Communication between the controller on the computer and the controlled system may be via wireless or non-wireless media.

Additionally, in the commercial HVAC industry, there may be a need to have complex applications that are tested and implemented in controlling devices. These devices should be low cost and be able to meet application needs. There also appears to be a need to have a flexible low cost controller that allows applications to be met as demands change within the low cost controller platform and tools. The function block framework of the present system may provide a logical application structure that allows a system control application designer (e.g., HVAC) to combine predesigned blocks featuring powerful control capabilities and thorough connections of libraries and block functions, that may be incorporated the development of sophisticated applications to meet new and advanced customer needs.

The present function block engine system may use relatively little memory in view of its significantly powerful and revolutionary capabilities. Programmable controllers may be implemented as engines that can interpret a meta language that is resident wholly or partially in a random access memory (RAM) as it runs. This means that minimal RAM requirements for a small program may be about 15K bytes (Kb) and can grow in proportion to the program. An inexpensive microprocessor may typically have a rather small RAM (e.g., 2K bytes or less) which means that a little amount of RAM (i.e., about 1 Kb) is available after operating system (OS) and communication capabilities are taken into consideration. However, by providing programmability from a function block engine, as described herein, that is resident in FLASH and having the functions use a common pool of RAM to hold minimal static value storage while the rest of the pool is reused by all the blocks for temporary execution space, fairly complex programs can be executed with a fixed memory allocation of about 1K of RAM. The program may simply be a list of "function" calls, as described by the function block definitions herein, which can be downloaded to a small file in FLASH.

A function block engine, a block execution list and a parameter and/or variable storage space may be resident in a memory supporting the engine. The function block engine may execute a program according to a list of function blocks identified in the block execution list to design and construct and circuit or system. Also, the engine may provide simulation of the resultant circuit or system. The circuit or system may be transferred to a memory of another device for implementation and use as, for example, a controller. In some cases, the program may be executed from the memory. The engine may permit field programmability, configuration and simulation of the function blocks and resulting circuit or system.

Figure 10:
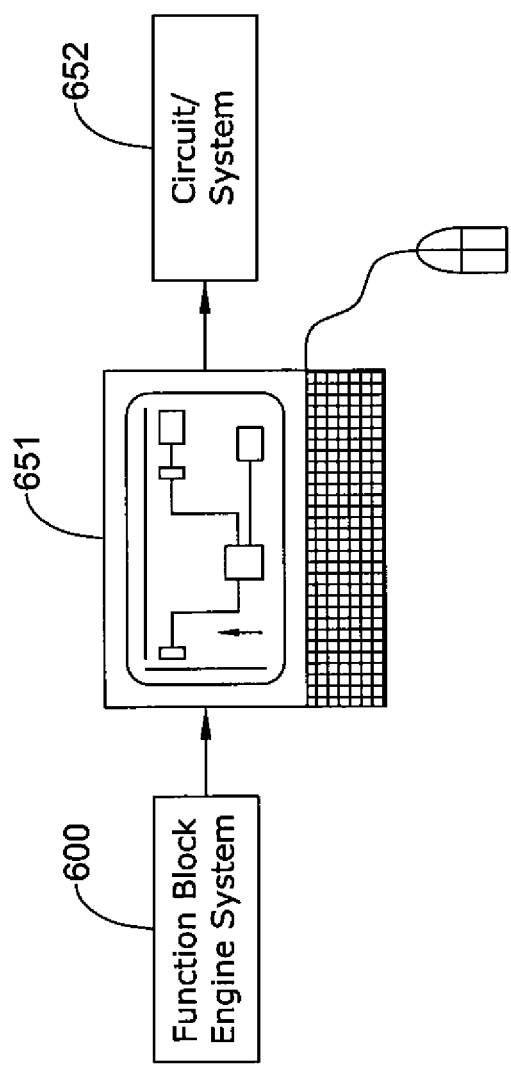
FIG. 10 is a diagram of a relationship of the function block engine system, computer and resulting circuit or system.

FIG. 10 is a diagram showing relationship of the function block engine system 600, computer 651 and a resulting circuit or system 652. One may take the present function block engine system 600, perhaps on a memory medium (e.g., disk, stick or the like) to store and/or load it into a memory of an operating system such as that of a personal computer 651. One may design a circuit or system 652, for example, a controller, with the function block engine system 600. That circuit or system 652 may be put into a memory, for instance, in microcode, or another code, manner or mode. The memory with the system 652 may be tied in with an operating system to provide the activity of a controller having the connections with the hardware or other to be controlled and monitored based on the function block designed system 652.

FIGS. 11-17 show an operation for designing simple example system 652 with the function block engine system 600. This operation may be implemented in a system designer and simulator on a personal computer 651 with software such as, for example, "Microsoft Windows XP Professional™". One may have a screen like that shown in FIG. 11. A mouse may be used to move an arrow 611 to click on "controller" and then on "configure" of the tool bar 612. Then one may, for example, click and drag out a function block 601 entitled "Timeset" from function block source area 602 into an area 603 of a display screen with the mouse arrow 611. Even though a function block 601, for instance, may be dragged from area 203 to area 603, the source 601 of the function block would remain in area 602. Then one may drag a Limit 604 from area 602 to area 603. One may place the mouse arrow 611 on an output terminal 605 of block 601 and drag a connection 606 to an input terminal 607 of limit 604. An add function block 608 may be dragged from area 602 to area 603. A network variable input block 609 may be dragged with the mouse arrow 611 into area 603. A multiply function block 610 may be dragged from area 602 to area 603. The mouse arrow 611 may be placed and clicked on a terminal 613 of block 609 and a line 614 may be dragged from terminal 613 to a terminal 615 of function block 610 to make a connection between block 610 and input 609. In a similar manner a line 616 may be dragged from an output terminal 617 of block 610 to an input terminal 618 of block 608. Also, a connection may be made with a line 619 from an output terminal 621 of limit block 604 to an input terminal 622 of the add block 608. The add function block 608 may add input values at terminals 618 and 622 to result in a sum at an output terminal 623 of block 608. The output at terminal 623 may be provided to an input terminal 624 of another limit function block 625 with a line 626. The source of limit function block 625 may be the same as that for limit function block 604 which is from area 602. To check the inputs of add function block 608, one may right click the mouse and click on edit to get a dialogue box that shows the inputs which may changed to one or more parameters with values placed in them in lieu of inputs to the add function block 608. The same may be done for the multiply function block 610 where one input is replaced with a parameter of four which can be multiplied with a value at input at 615 to get a result at terminal 617. Also, other things, such as function block names, may be changed in this right-clicked edit dialogue box.

The circuit or system design with function blocks in area 603 may continue on to another page as shown in the tool bar 612. The pages may be relabeled, for example, as page 1 was relabeled ad ADD1 at place 626 and page 2 was relabeled as ADD2 at place 627. The circuit or system may be continued on to the next page ADD2 with a TAG connection block 628, which can be dragged with the arrow 611 from the block source area 602 to area 603. An output terminal 629 of block 625 may be connected with a line 631 dragged out with arrow 611 from terminal 629 to a terminal 632 of tag block 628.

Figure 12:
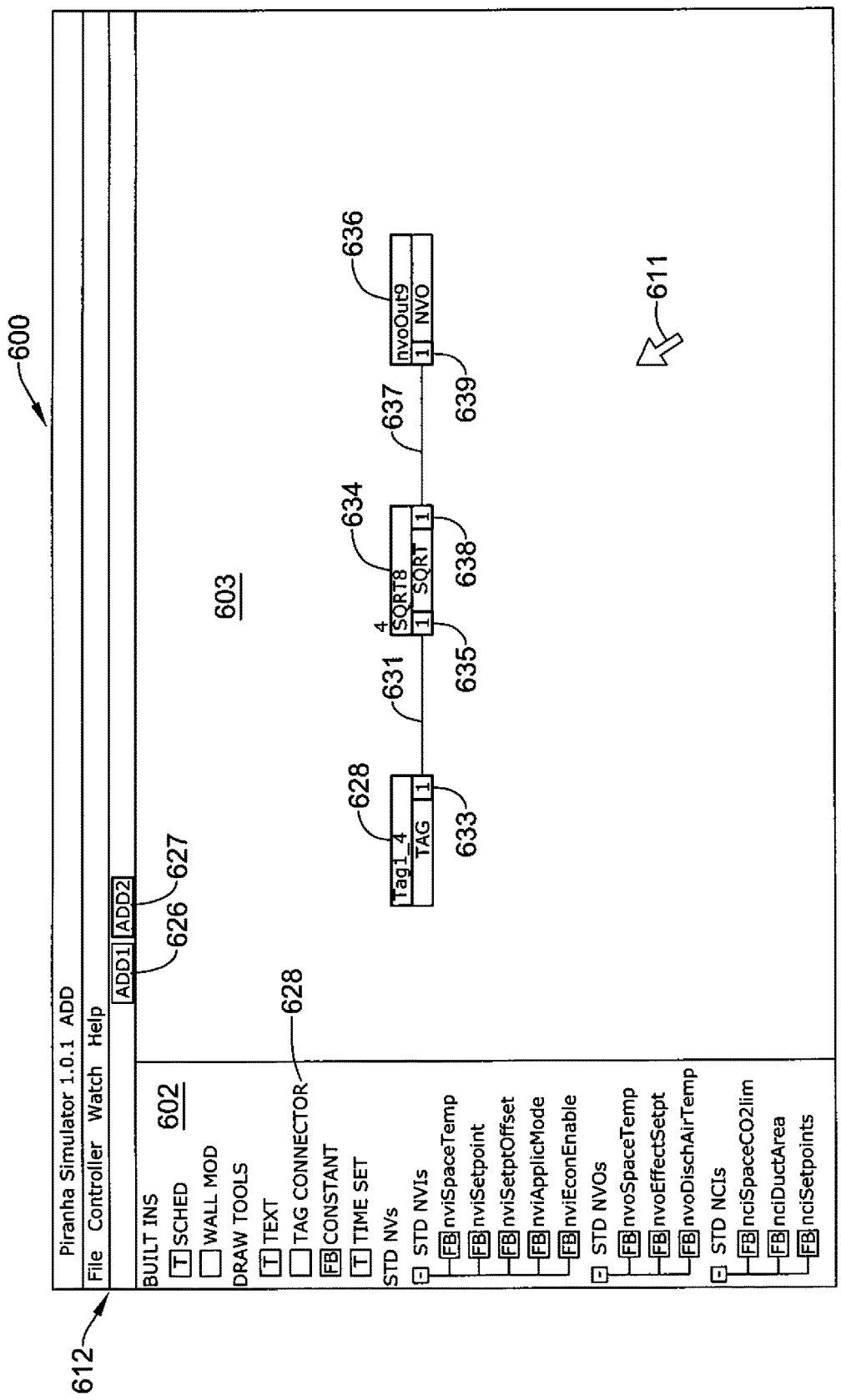
FIG. 12 shows a second page of the screen of FIG. 11.

FIG. 12 shows a continuation of the circuit or system from page ADD1 to page ADD2. Tag 628 may be a continuation of line 631 via input terminal 632 and an output terminal 633 of tag 628 in FIG. 12. A square root function block 634 may be dragged from area 602 to area 603 of the display. The line 631 connection may be dragged with the arrow 611 from terminal 633 to an input terminal 635 of the square root function block 634. A network variable output 636 may be dragged from area 602 into area 603 of the display with the mouse arrow 611. A connection line 637 may be dragged from an output terminal 638 of block 634 to a terminal 639 of output block 636.

The ADD1 626 and ADD 627 pages may themselves be placed into individual function blocks with their respective inputs and outputs. The block of pages 626 and 627 may be placed into one function block. If there are other function blocks having a number of pages of circuits made from various function blocks, they also may be combined into one function block. These one function blocks might be interconnected and also combined into still another one function block. This hierarchical progression of function blocks being combined may continue until an entire system of a design is in one block, such as an aircraft instrumentation, industrial plant, HVAC or some other kind of controller. The resulting function block might be treated as a black box in some instances.

Figure 13:
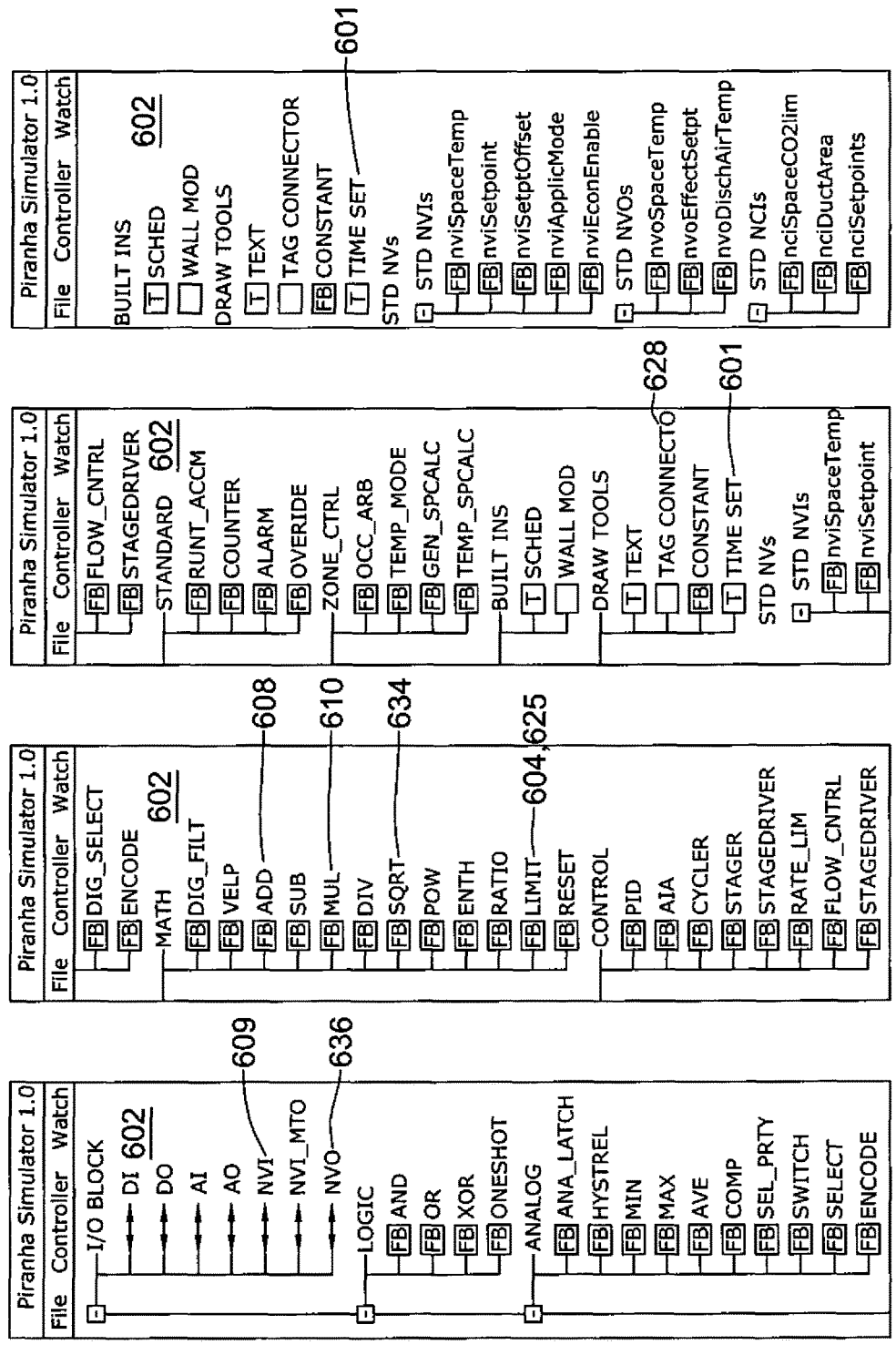
FIG. 13 shows from the screen a partial list of function blocks and other items that may be used in designing a circuit or system.

FIG. 13 shows a list of function blocks and terminals in area 602 of the display that may be selected for developing various kinds of designs. The list is not inclusive in that other function blocks and terminals may be added.

Figure 11:
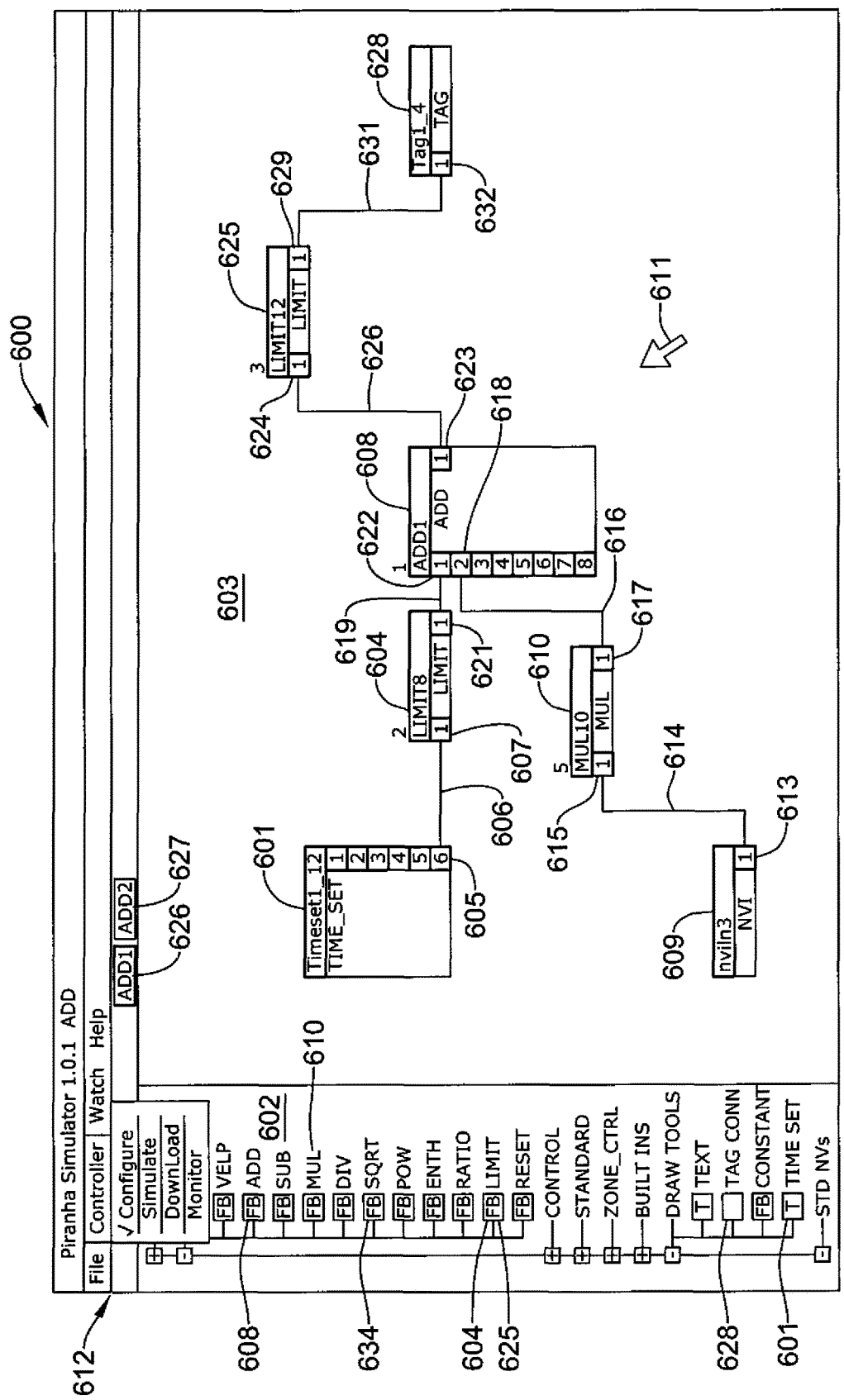
FIG. 11 shows a display screen set up for designing circuits or systems with function blocks.
Figure 14:
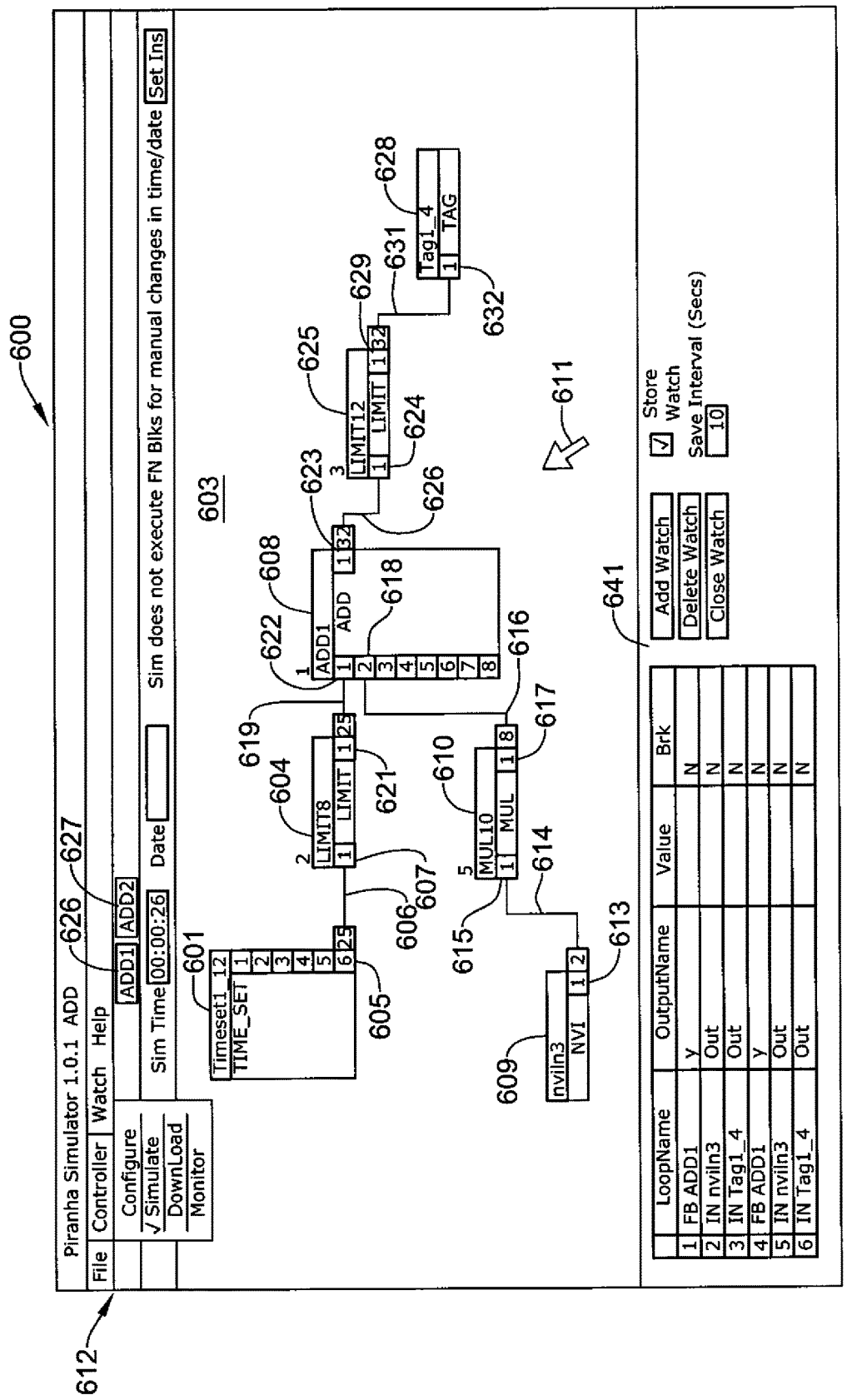
FIG. 14 shows a screen for a simulate mode for the designed circuit or system of FIGS. 12 and 13.
Figure 15:
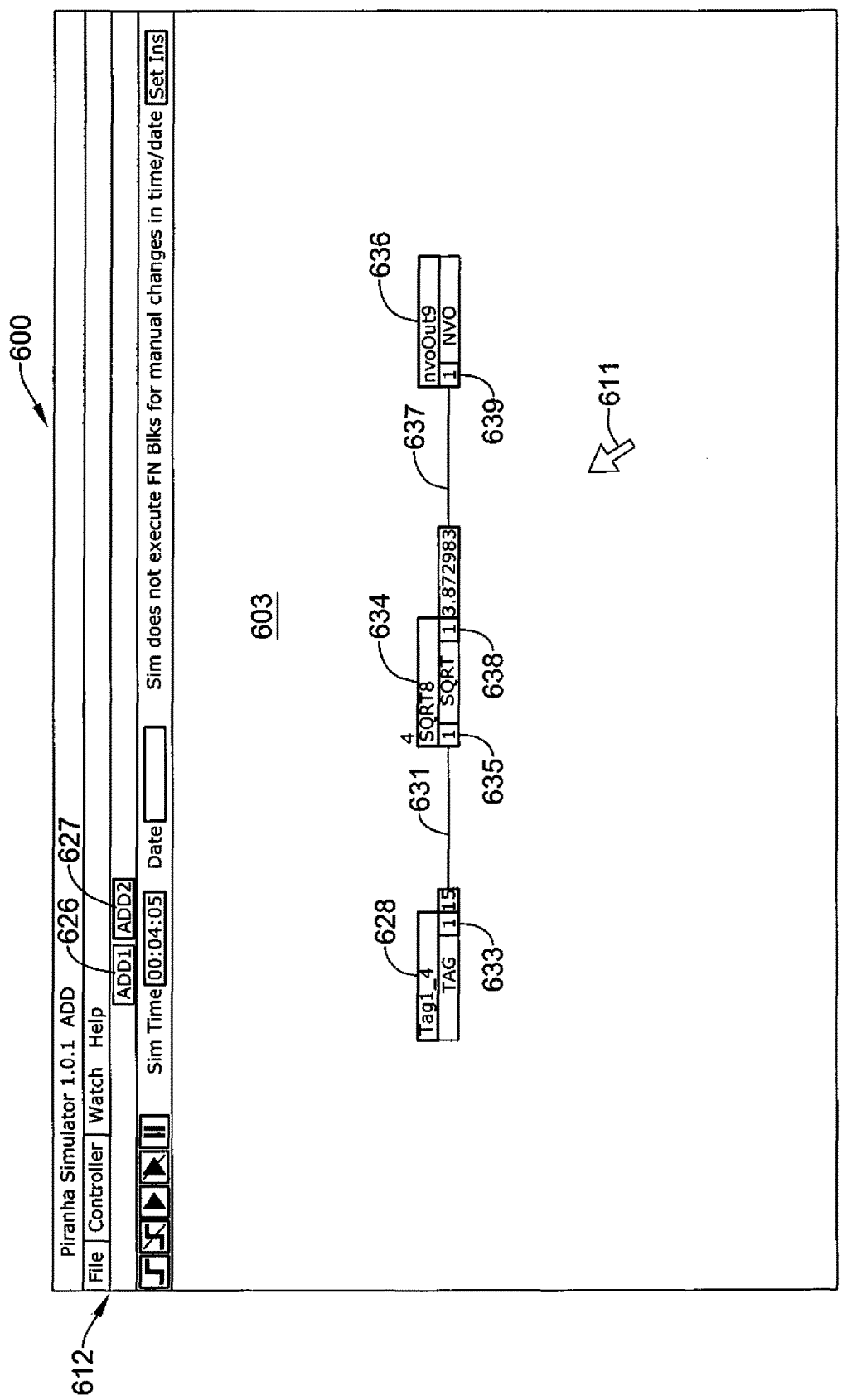
FIG. 15 shows a second page of the screen of FIG. 14.
Figure 17:
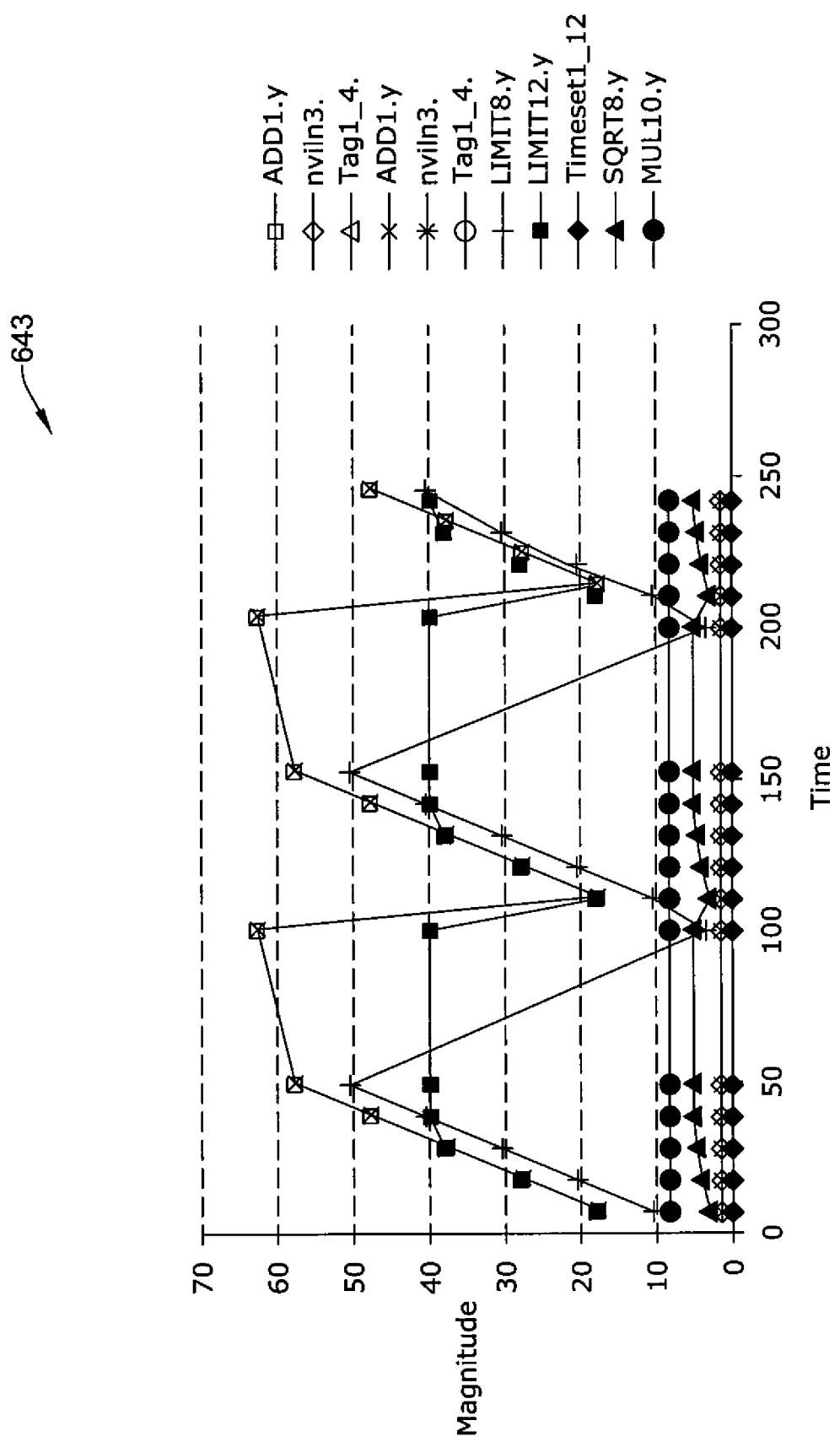
FIG. 17 is a graph of the data in the table in FIG. 16.

FIGS. 14 and 15 show the circuits of FIGS. 11 and 12, respectively, in a simulate mode which may be selected by clicking on "controller" of the tool bar 612 with the mouse arrow 611. Then "simulate" may be clicked on to put the designed circuit into an operational-like scenario. The label "watch" on the tool bar 612 may be clicked on to get the watch dialogue box 641. The loops and outputs along with their respective values may be listed in box 641. Also, values for each increment of time may be provided at the various output terminals of the function blocks. For example, a value of "25" is shown at the output terminal 621 of the limit function block 604. Units may be of time, magnitudes, or some other kind of measurement. The circuit or system, on pages ADD1 626 and ADD2 627 indicated on the tool bar 612, may include analog, digital or a combination of digital and analog function blocks. A simulation may run for various inputs may be recorded in a table 642 as shown in FIG. 16 and plotted as shown in a graph 643 of FIG. 17. Graph 643 shows magnitudes for various outputs versus time.

Figure 18:
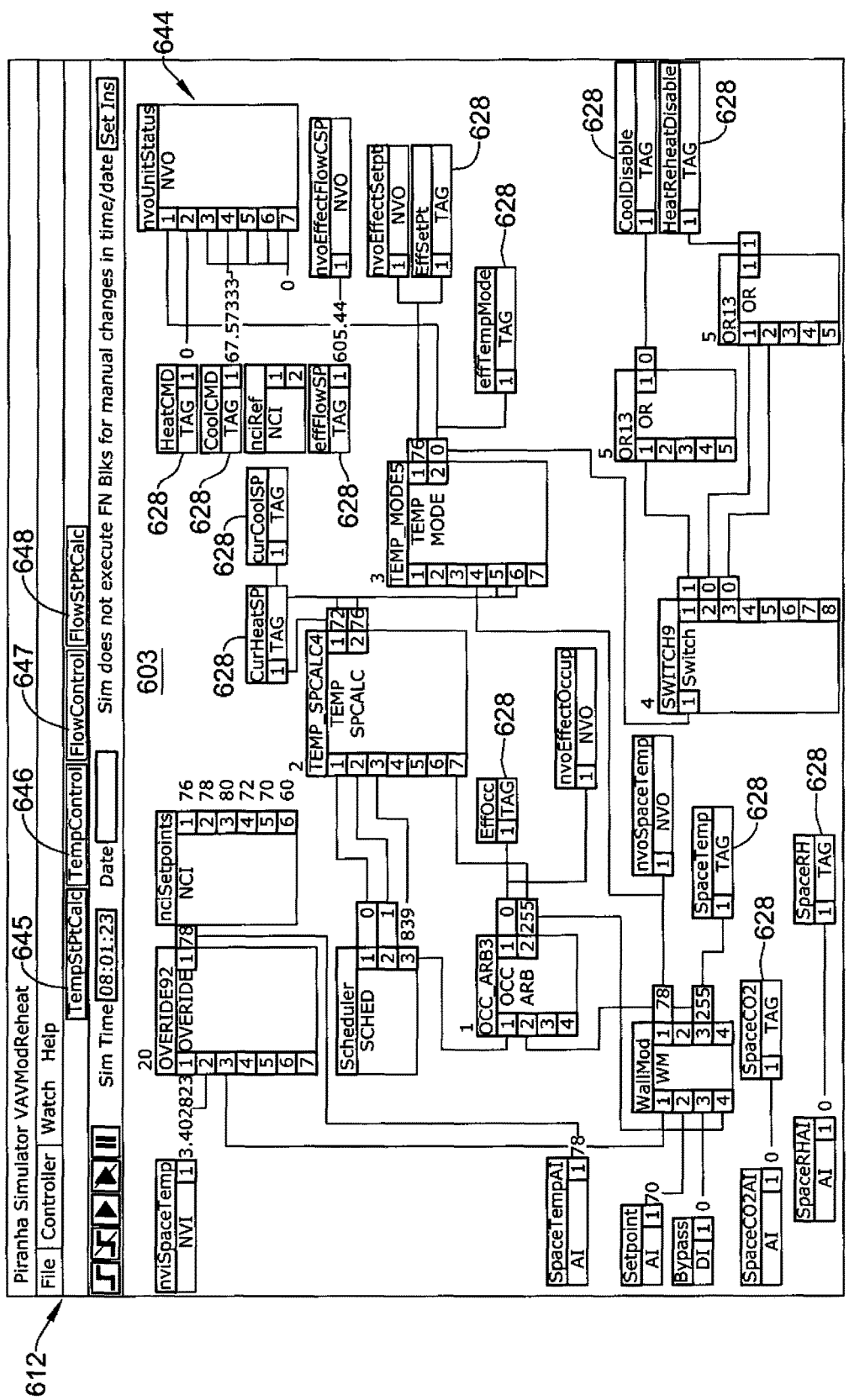
FIG. 18 shows a display screen with one of several pages showing a designed system have somewhat more complexity that the example circuit or system of FIGS. 11 and 12.

FIG. 18 shows a simulation mode of a somewhat intricate circuit 644 of function blocks. Tool bar 612 appears to show that this circuit 644 is one of four pages 645, 646, 647, and 648 of a larger combination of function blocks interconnected via tag connections 628.

Figure 19:
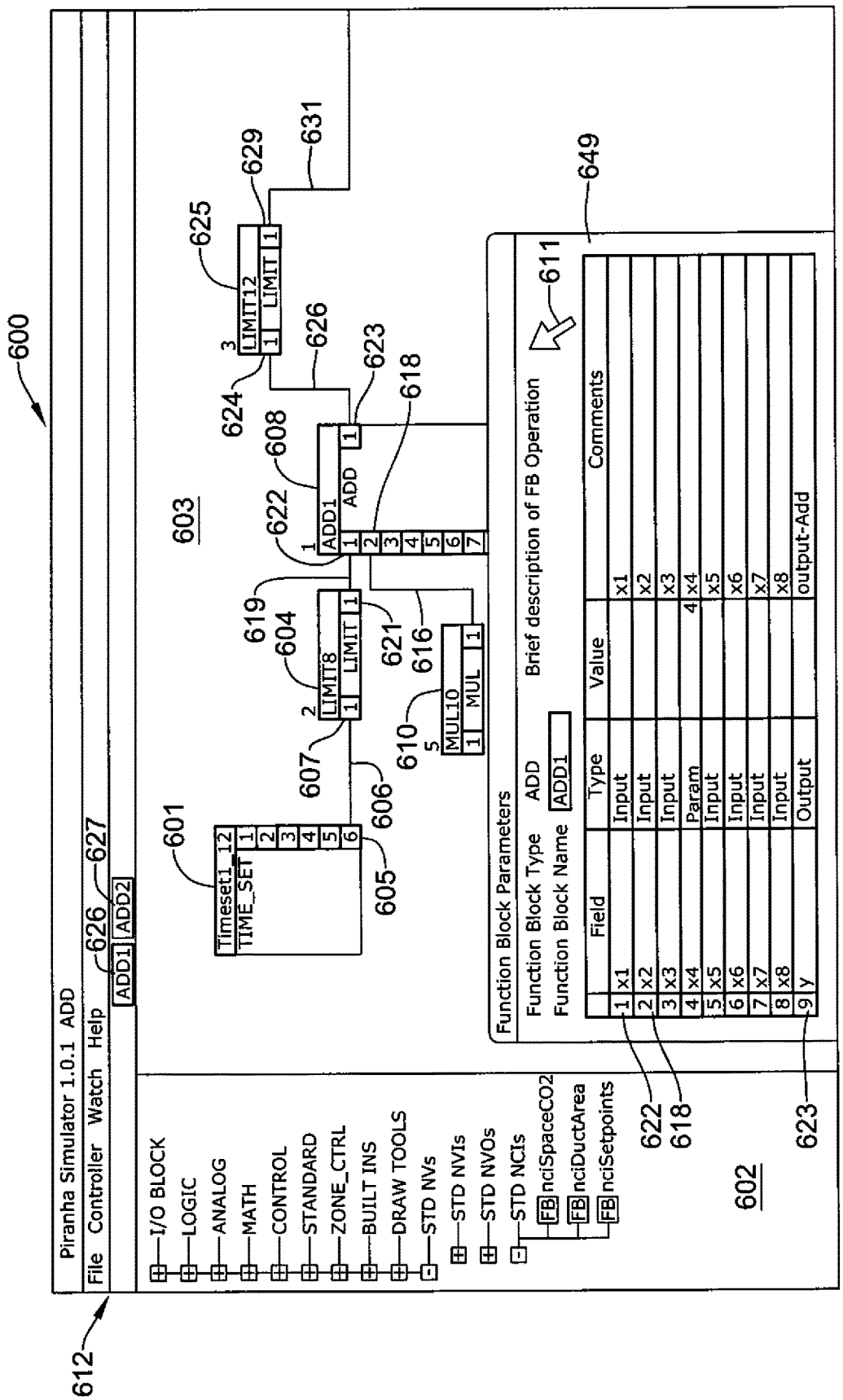
FIG. 19 shows a dialog box with inputs, a parameter and an output.

FIG. 19 shows a portion of the layout of the circuit in FIG. 12, but with a dialogue box 649 showing the inputs and output of the add function block 608, as discussed herein.

Figure 20:
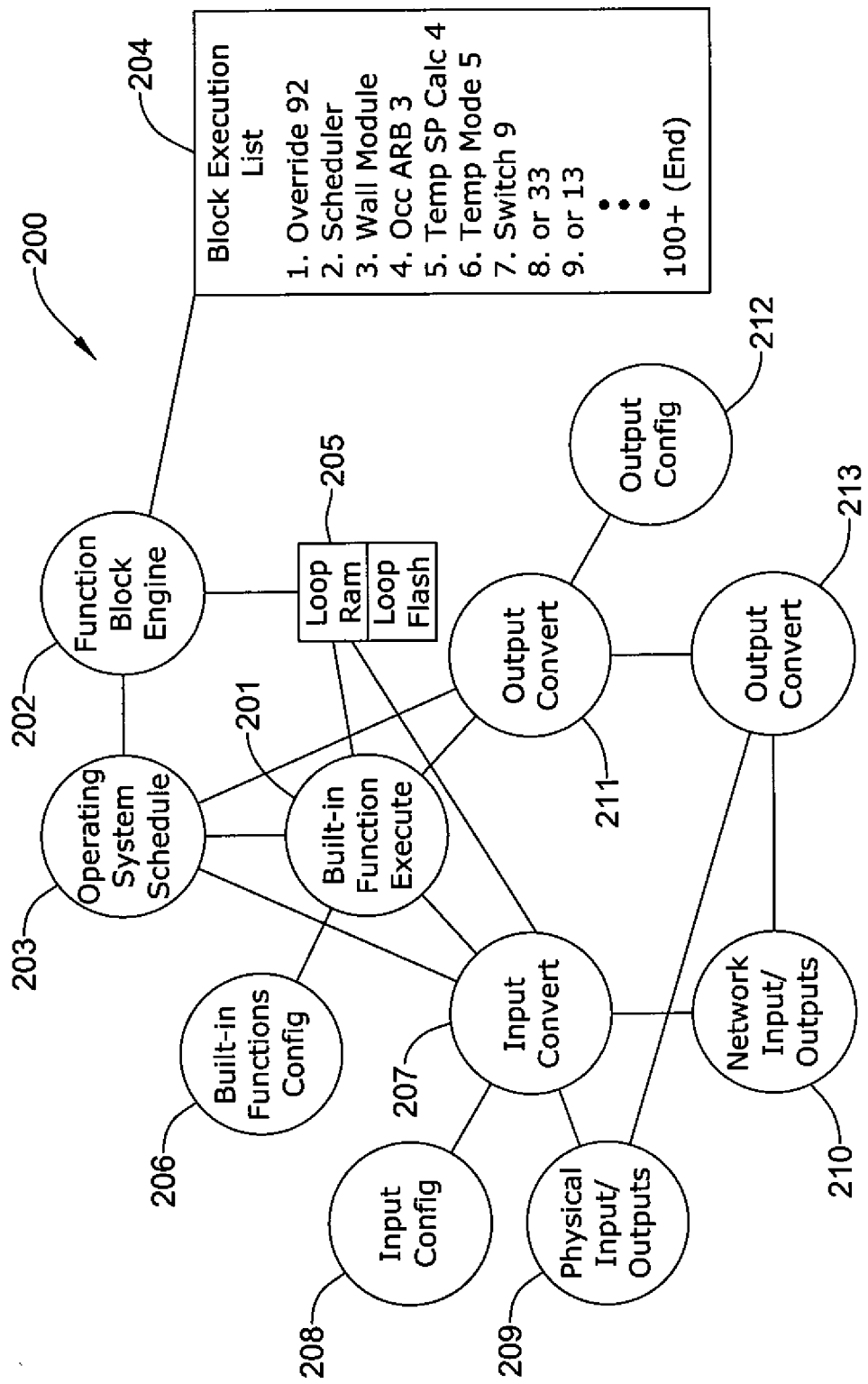
FIG. 20 is a diagram of a function block system.

FIG. 20 is a diagram of a function block system 200 which may have application to the balancing or other system. Built-in function execute 201 may be connected to operating system schedule 203, loop RAM/FLASH 205, built-in functions configuration 206, input converter 207, and output converter 211. Function block engine 202 may be connected to operating system schedule 203, block execution list 204, and loop RAM/FLASH 205. Operating system schedule 203 is connected to input converter 207 and output converter 211. Input converter 207 is connected to loop RAM/FLASH 205, input configuration 208, physical input/outputs 209, and network input/outputs 210. Output converter 211 is connected to output configuration 212 and output converter 213. Output converter 213 is connected to physical input/outputs 209 and network input/outputs 210.

Figure 21:
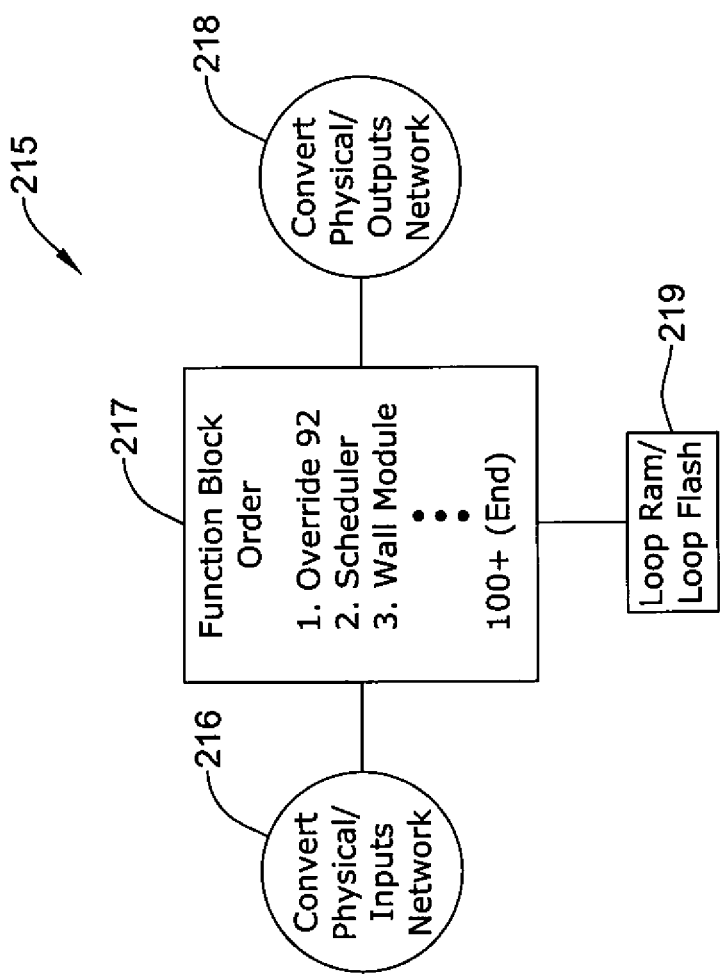
FIG. 21 is a summary variable air volume block flow diagram.

FIG. 21 is a summary block flow diagram 215. A convert physical/inputs network 216 may be connected to a function block order list 217. The function block order list 217 may be connected to a convert physical/outputs network 218 and to a loop RAM/FLASH 219.

Figure 22:
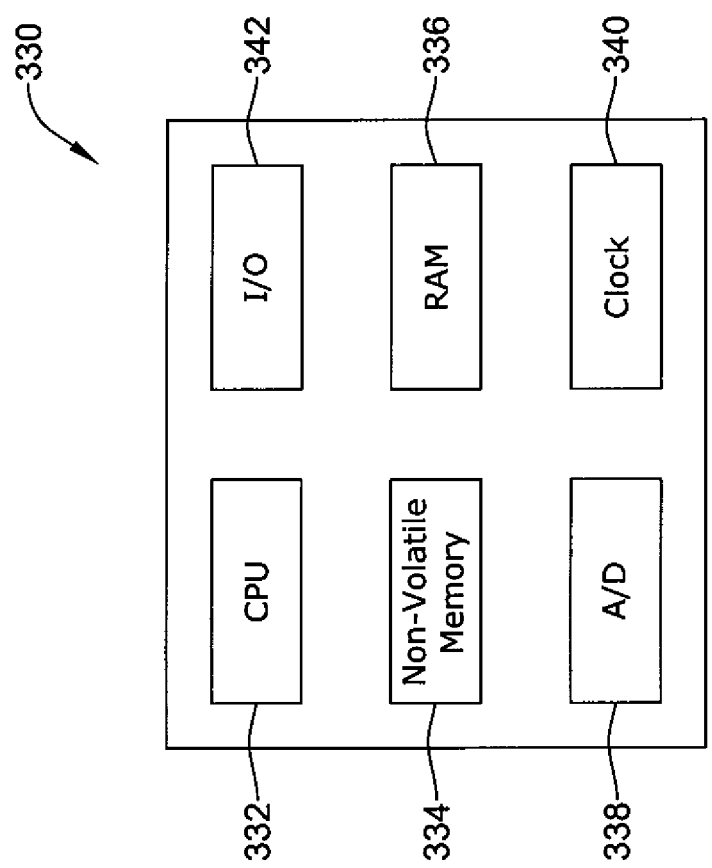
FIG. 22 is a block diagram of an illustrative programmable HVAC controller.

FIG. 22 is a block diagram of an illustrative programmable HVAC controller. The illustrative HVAC controller may be a programmable thermostat, or may be separate from the thermostat. In either case, the HVAC controller may provide one or more control signals that effect the operation of the HVAC system.

The illustrative HVAC controller may include a microcontroller 330 having a non-volatile memory 334 and a random-access memory (RAM) 336. Additionally, the illustrative microcontroller 330 may include a central-processing unit (CPU) 332, analog-to-digital converters (A/D) 338, input/outputs (I/O) 342, and a clock 340 or timer. The illustrative microcontroller 330 may include more or less than these illustrative components, depending on the circumstances. As illustrated, the aforementioned components may be provided internal to the microcontroller 330 without the need for any external components, but this is not required.

In some cases, the least expensive form of processor is a microcontroller. Microcontrollers typically contain all the memory 334 and 336 and I/O 342 interfaces, integrated on a single chip or device (e.g., microcontroller) without the need for external components. As noted above, one advantage of using a microcontroller 330 is the low cost when compared to the cost of a typical microprocessor. Additionally, microcontrollers 330 may be designed for specific tasks, such as HVAC tasks, which can help simplify the controller and reduce the number of parts needed, thereby further reducing the cost. While the use of a microcontroller may have some benefits, it is contemplated that the present system may be used in conjunction with a microprocessor or any other suitable controller, as desired.

In the illustrative microcontroller 330, the non-volatile memory 334 may be FLASH memory. However, it is contemplated that the non-volatile memory 334 may be Read Only Memory (ROM), programmable Read Only Memory (PROM), Electrically Erasable Programmable Read Only Memory (EEPROM), Random Access Memory (RAM) with a battery back-up, or any other suitable non-volatile memory 334, as desired. In the illustrative example, the amount of FLASH memory may be less than 100 Kb. In one case, the amount of FLASH memory may be about 60 Kb; however, it is contemplated that any amount of FLASH may be used depending on the requirements per application.

In some illustrative examples, the non-volatile memory 334 may be configured to have at least two portions including a first portion that is the equivalent of ROM and a second portion that is the equivalent of EEPROM. The first portion of non-volatile memory 334, often called the firmware portion, may be used to store at least in part one or more execution modules, such as, for example, a function block engine. In some cases, this portion of the non-volatile memory 334 may be programmed at the factory, and not subsequently changed. Additionally, the one or more execution modules (e.g., function block engine) stored in the firmware portion may execute, in some cases, one or more function blocks also stored in the non-volatile memory 334.

The second portion of the non-volatile memory 334 may include application configuration modules or data, including for example, a block execution list. In some cases, the non-volatile memory 334 in this second portion may be divided further to contain segments of data. This portion of the non-volatile memory 334 may be capable of being reconfigured post factory, such as during installation of the controller into an HVAC system in a building or structure. In other words, in some illustrative examples, the second portion of the non-volatile memory may be field programmable. In some cases, the amount of non-volatile memory 334 allotted for the second portion may be about 5 Kb. However, it is contemplated that any amount of field programmable memory may be provided, as desired.

It is further contemplated that the non-volatile memory 334 may also have a portion dedicated for the storage of constant values. This portion of memory may be provided in, for example, the firmware portion and/or the field programmable portion, as desired.

In the illustrative microcontroller 330, the RAM 336 may be used for variable storage. In some cases, the RAM 336 may be a relatively small repository for exchanging information during execution of the one or more programs or subroutines stored in the non-volatile memory 334. The RAM 336 may also be used for hosting the operating system of the microcontroller 330 and/or the communication capabilities, such as external interfaces. In the illustrative microcontroller 330, the amount of RAM 336 included may be about 5 Kb or less, 2 Kb or less, or any other suitable amount of RAM. In some cases, the operating system and communication capabilities may consume about 1 Kb of RAM 336, leaving about 1 Kb for other functions, such as storing variables and/or other data for the one or more programs.

The CPU 332 for the illustrative microcontroller 330 may interpret and execute instructions, and may control other parts of the microcontroller 330 as desired. In some cases, the CPU 332 may include a control unit and an arithmetic-logic unit contained on a chip. The clock 340 can provide a steady stream of timed pulses for the microcontroller 330, which may be used, for example, as the internal timing device of the microcontroller 330 upon which operations may depend. The I/Os 342 can transfer data to and from the microcontroller 330 and an external component. In some cases, for each input, there may be a corresponding output process and vice versa. The A/D 338 converter can provide transformations of an analog input into a digital input format helping to enable the microprocessor to be able to read and interpret analog input signals. In some cases, a D/A converter may also be provided to allow digital signals to be provided as analog outputs, if desired.

Figure 23:
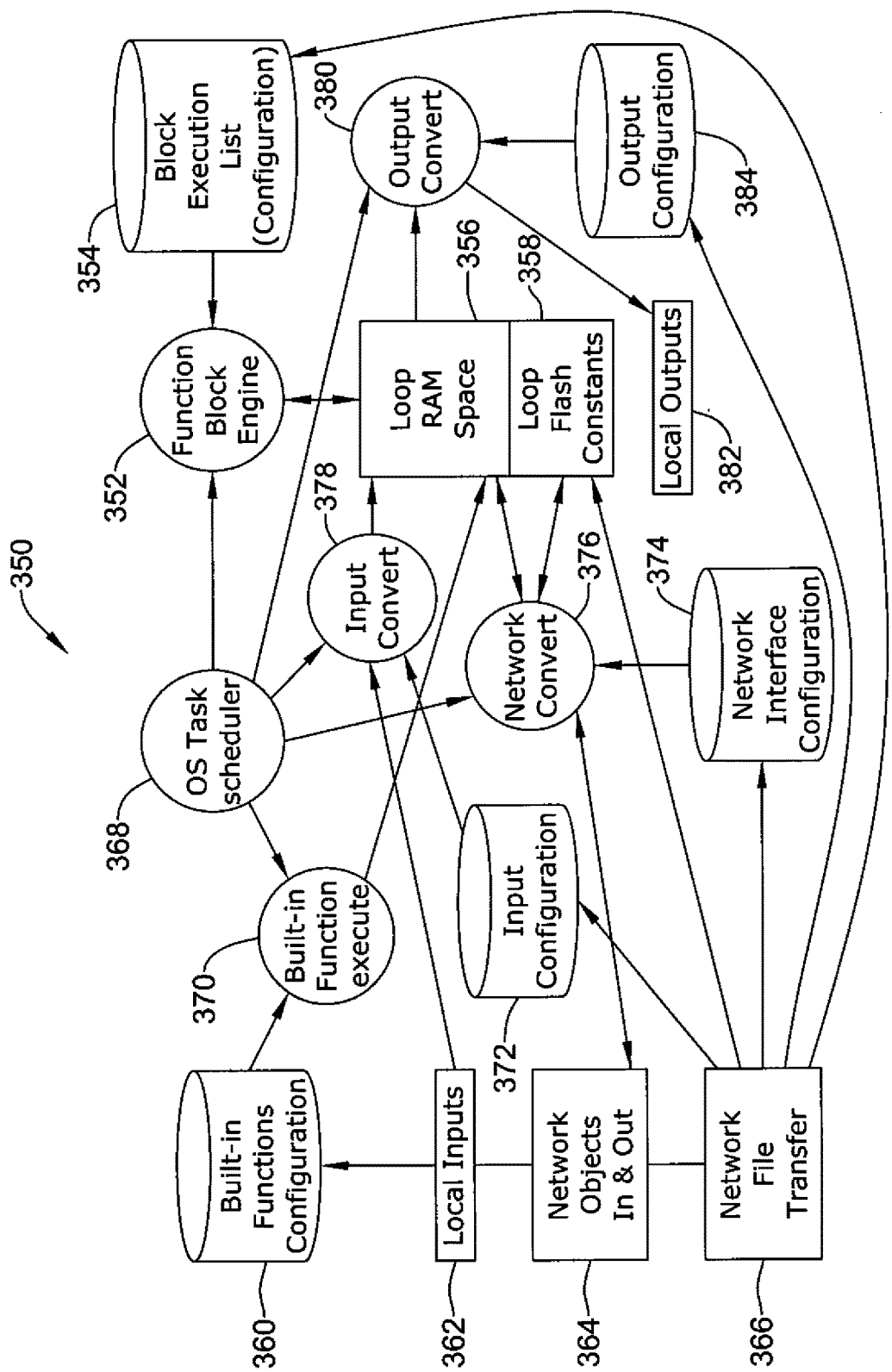
FIG. 23 is a schematic diagram of an illustrative application framework of a programmable controller.

FIG. 23 is a schematic diagram of an illustrative application framework of a programmable controller 350. The illustrative controller 350 includes one or more execution modules, one or more application configuration modules, and a parameter and variable storage space. The execution modules, as illustrated by the circles in FIG. 23, can include a function block engine 352, a built-in function execute module 370, an input convert module 378, a network convert module 376, and an output convert module 380. The application configuration modules, as illustrated by the cylinders, can include a block execution list 354, a built-in functions configuration 360, an input configuration 372, a network interface configuration 374, and an output configuration 384. The parameter and variable storage space can include a loop RAM space 356 and a loop flash constant space 358. Additionally, the illustrative controller 350 may include one or more external interfaces for communication capabilities, including a local input 362, a network file transfer 366, a network object in and out 364, and a local output 382. In some cases, the controller 350 may also include an operating system (OS) task scheduler 368.

The one or more execution modules can be resident in the non-volatile memory of the microcontroller 350, such as in FLASH memory. More specifically, in some cases, the one or more execution modules may be resident in the ROM equivalent or firmware portion of the non-volatile memory. At least one of the execution modules may include one or more programs, some of the one or more programs relating to the operation of the HVAC system. The one or more programs may include a set of sub-routines that the one or more execution modules can sequentially execute. The one or more execution modules may execute the one or more programs from the non-volatile memory.

The one or more application configuration modules can also be resident in the non-volatile memory, such as the FLASH memory, of the microcontroller 350. More specifically, the one or more application configuration modules can be resident in the EEPROM equivalent or the field programmable portion of the non-volatile memory. These modules can be pre-configured for standard HVAC applications or can be configured for custom HVAC applications, as desired. Additionally, the one or more application configuration modules can be field programmable. For example, in some cases, the one or more application configuration modules may be programmed and configured either during or after the installation of the controller into a HVAC system.

In some cases, the one or more application configuration modules can include a block execution list 354. The configuration of the block execution list 354 can direct the execution of the one or more execution modules (e.g., function blocks). In some cases, this configuration can be determined by the user or the installer. In some cases, a programming tool may be used that allows the installer to select the appropriate function blocks to create a custom block execution list 354, along with the appropriate configurations, to perform specific HVAC applications. This may help the one or more application configuration modules to be configured on a job-by-job basis, which in turn, can direct the execution of the execution modules on a job-by-job basis. In some cases, the one or more application configuration modules can include parameters or references that point to a location in memory for data, such as to the parameter and variable storage space.

The parameter and variable storage space may be provided in the controller 350 for the one or more execution modules and/or one or more application configuration modules to reference data or values to and from storage space. In an illustrative example, the variable parameter storage space, or loop RAM space 356, may be resident in RAM. This storage space can be used for the temporary storage of variables or parameters, such as function block outputs and/or temporary values from inputs, either local inputs or network inputs, of the controller 350.

Also, in the illustrative example, the constant parameter storage space, or loop flash constants 358, may be a storage space for storing constant values determined by the programmer or user. This storage space may be resident in non-volatile memory, such as the FLASH memory. Certain set points and operational parameters may be designated as constant parameter values selected by the application designer, installer, or user, and may be stored in the loop flash constants 358 storage space, if desired.

The HVAC controller 350 may also include external interfaces, such as local inputs 362 and local outputs 382. The local inputs 362 may be stored according to the input configuration 372 module executed by the input convert module 378. These modules may direct to storage the input value so that it can be used by other execution modules, such as the function block engine 352. The local outputs 382 may be configured according to the output configuration 384 as executed by the output convert module 380. This may output the value or data to an external HVAC component, such as a damper, thermostat, HVAC controller, or any other HVAC component as desired.

The OS task scheduler 368 may determine the operation and execution of the execution modules within the HVAC controller 350. For example, the execution modules may be executed in the following order: discrete inputs; including input convert 378 and network convert 376; built-in function execution 360; function block execution 352; physical output processing 380; and finally network output processing 376. However, it is contemplated that any suitable order may be used as desired.

Figure 24:
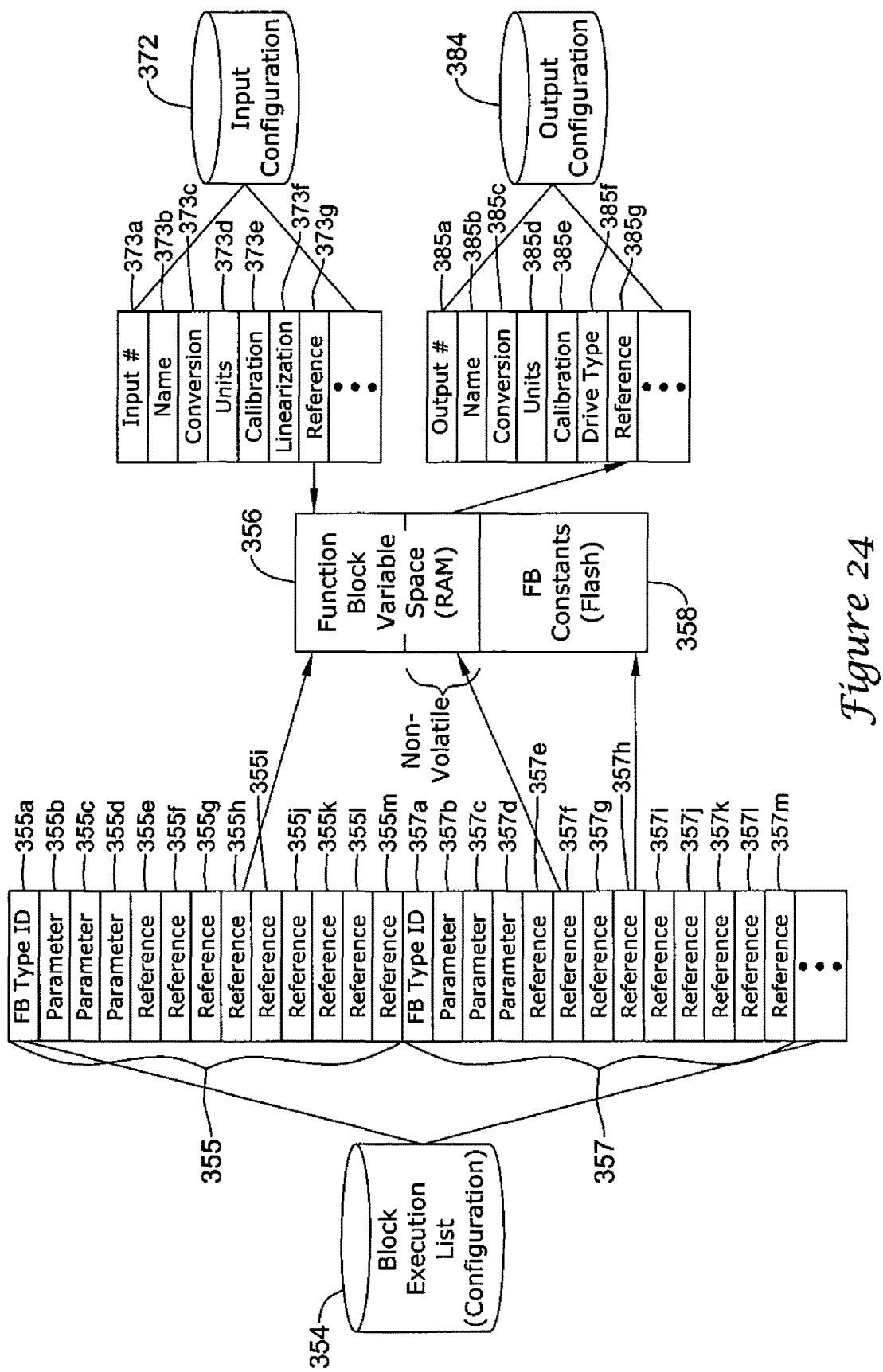
FIG. 24 is a schematic diagram of illustrative application configuration modules.

FIG. 24 is a schematic diagram of some illustrative application configuration modules of FIG. 23, including an illustrative block execution list 354. As indicated above, the block execution list 354 may be resident in non-volatile memory, such as FLASH memory, and more specifically the field programmable portion of the FLASH memory, if desired. The illustrative block execution list 354 includes a listing of one or more function blocks 355 and 357, and is used to direct which function blocks and the order of execution of the function blocks, executed by the function block engine 352 according to its configuration.

The block execution list 354 may be programmed at the factory or by the user or the installer, to configure the order and type of function blocks 355 and 357 that are to be executed for the particular application. In some cases, the user or installer can have a programming tool that allows the user or installer to select the appropriate function blocks 355 and 357 and configuration to perform the desired tasks for the particular application. Thus, in some examples, the block execution list 354 configuration may be provided on a job-by-job basis for the controller. In some cases, this can allow the block execution list 354 to be programmed and configured in the field and changed depending on the desired application and function of the controller.

In the illustrative example, the Function blocks 355 and 357 are modules that perform a specific task by reading inputs, operating on them, and outputting one or more values. The function block 355 and 357 can be defined according to the block execution list 354, which can be programmed by the factory, user, installer, or application designer. In the illustrative example, function blocks 355 and 357 may be classified into six categories: analog function blocks, logic function blocks, math function blocks, control function blocks, zone control function blocks, and data function blocks.

The function blocks 355 and 357 may perform higher level functions, such as higher level functions for HVAC operations. Additionally, the controller may include some more generic function blocks for performing some basic applications, but, in many cases, these may be combined with other function blocks to perform higher level HVAC application.

Referring back to FIG. 24, function blocks 355 and 357 may include a number of function calls or pointers to particular locations in memory. In the illustrative example, each function block 355 and 357 may include a function block type 355a and 357a, and a number of parameter or references 355b-m and 357b-m. The references and parameter 355b-m and 357b-m may point to variables or constants that are stored in the parameter and variable storage space, such as in either the function block variable space 356 or the function block constant space 358. Additionally, in some cases, the reference and parameters 355b-m and 357b-m may relate to other function block outputs, inputs (either local or network), or pointers to any other data, as desired.

In one illustrative example, each function block may be about 22 bytes long. Each function block may include the function block type 355a and 357a, which can be one byte. Each function block can also include nine references or variables 355e-m and 357e-m, each reference or variable being allocated 2 byte WORD increments, totaling 18 bytes. Also, each function block 355 and 357 may include three parameter or configurations 355b-d and 357b-d, each being one byte, totaling 3 bytes. However, these sizes are merely for illustrative purposes and it is not meant to be limiting in any way.

It is contemplated that any size function blocks 355 and 357 may be used, and/or any number or size of function block types 355a and 357a, references or variables 355e-m and 357e-m, and parameters or configurations 355b-d and 357b-d. Furthermore, it is contemplated that the order may be the function block type 355a and 357a, then one parameter 355b and 357b, then the nine references 355e-m and 357e-m, and then the two remaining parameters 355c-d and 357c-d. More generally, it is contemplated that the function blocks 355 and 357 may be configured in any order and have any number of references and parameters, as desired.

The function block type 355a and 357a may be used to specify what function the function block 355 and 357 performs. Examples of functions that function block types 355a and 357a can perform may include, but are not limited to, one or more of: determining a minimum; determining a maximum; determining an average; performing a compare function; performing an analog latch function; performing a priority select function; performing a hysteretic relay function; performing a switch function; performing a select function; performing an AND/NAND function; performing an OR/NOR function; performing an exclusive OR/NOR function; performing a one shot function; performing an add function; performing a subtract function; performing a multiply function; performing a divide function; performing a square root function; performing an exponential function; performing a digital filter function; performing an enthalpy calculation function; performing a ratio function; performing a limit function; performing a reset function; performing a flow velocity calculation function; performing a proportional integral derivative (PID) function; performing a adaptive integral action (AIA) function; performing a stager/thermostat cycler function; performing a stage driver function; performing a stage driver add function; performing a rate limit function; performing a variable air volume (VAV) damper flow control function; performing an occupancy arbitrator function; performing a general set point calculator function; performing a temperature set point calculator function; performing a set temperature mode function; performing a schedule override function; performing a run time accumulate function; performing a counter function; and performing an alarm function. More generally, any suitable function may be performed by function block types 355a and 357a, as desired.

Function block references 355e-m and 357e-m may be pointers to variables that can specify inputs, outputs and/or other data that is used by the function block 355 and 357. These variables may include data inputs that are used by the function block 355 and 357 during execution. In the illustrative example, there may be a number of variable type references that may each have a unique mapping to a memory class. In the illustrative example shown in FIG. 24, there are nine different types of variables: input, parameter, input/parameter, parameter/input, output floating point number, nonvolatile output floating point number, output digital, static floating point number, and static digital. The input variables may include an input reference for the function block 355 and 357 stored in, for example, RAM memory. The parameter variable may be a value for the function block 355 and 357 to use, which in some cases, can be stored in either RAM or FLASH memory. The input/parameter variable can be a reference to either an input or a parameter, with the default being an input and may, in some cases, be stored in either FLASH or RAM memory. The parameter/input variable can be either a parameter or an input with the default being a parameter, and in some cases, can be stored in FLASH memory. The output floating point number variable may be an output of the function block 355 and 357, which can be called up as an input to another function blocks that is later executed. In some cases, the output floating point number variables may be stored in volatile RAM memory. The nonvolatile output floating point number variable may be an output of the function block 355 and 357, which can be called up as an input to another function block. In some cases, nonvolatile output floating point number variables may be stored in non-volatile RAM memory so that it retains its value on a power outage. The output digital variable may be an output of the function block 355 and 357 that can be called up as an input to another function block. In some cases, the output digital variables may be stored in RAM memory. The static floating point number variable may allow a function block 355 and 357 to use floats as static RAM variables. The static digital variable may allows a function block 55 and 57 to use digitals as static RAM variables. Additionally, there may be unused references, indicating that these references/variables are unused. More generally, it is contemplated that there may be any number of variable type references, as desired.

The output of function blocks 355 and 357 can be stored, in some cases, in the RAM for later use by the function block engine. As indicated above, and in some cases, the outputs of a function block 355 and 357 can be used as an input reference to another function block 355 and 357. Additionally, in some cases, outputs can be referenced to the input of the same function block 355 and 357, when appropriate. However, if an input is referenced to its output, there may be a delay before receiving the output signal at the input of the function block (e.g., by one cycle or iteration) due to the sequential execution of the function blocks in one illustrative example. In some cases, it may take about one second for the execution of the function blocks 355 and 357, but this should not be required.

The parameters 355b-d and 357b-d may include design time configuration information needed by the function block 355 and 357 to execute. For example, the parameters 355b-d and 357b-d may instruct a corresponding function block 355 and 357 on how to initialize itself. In the illustrative example, each function block 355 and 357 may have three parameters 355b-d and 357b-d, each including one byte of configuration information, for this purpose. However, it is contemplated that any suitable number of parameters of any suitable size may be used, as desired. In some cases, the parameter information may be entered by the application designer, the installer in the field, or the user, as desired. The parameters 355b-d and 357b-d may be configured to apply to just one specific function block type, one specific function block instance, or multiple function blocks, depending on the application. In some cases, the parameters 355b-d and 357b-d may be stored in the function block constants storage space 358, but this should not be required.

The function block variable space 356 and the function block constant space 358 may be provided in the controller. For example, the function block variable space 356, which may change, may be resident in RAM memory of the controller. In some cases, the RAM may have a portion that is volatile and a portion that is non-volatile. In the volatile RAM, upon a power disruption, the data may be lost or reset, whereas in the non-volatile RAM, upon a power disruption, the data should be retained. Thus, data that is desirable to maintain upon a power disruption may be stored in the non-volatile RAM, while other data may be stored in the volatile RAM.

The function block constant space 358 may be a constant value storage space for data, such as parameters, as determined by the application designer, installer or user. The constant value storage space may be resident in non-volatile memory, such as FLASH memory. This may include certain set points and operational parameters that are designated as constant parameter values selected by the application designer at design time, by the installer, or the user. In order to change a constant parameter, and in some cases, a new function block configuration may have to be downloaded to the controller. Additionally, in some cases, a function block description, which may be available to the user, programmer, and/or installer, can provide details as to which parameters are variable and which are fixed. Providing the function block constant space 358 may help improve the efficiency of the controller by maintaining parameters and/or variables that could be used by the function blocks 355 and 357.

External interfaces, such as the network input/output and local input/output may also use the function block 355 and 357 variable space to map data in and out of the controller. To input data into the controller, an input configuration 372 may be provided to properly configure the input so that the function blocks identified in the block execution list 354 may properly reference the data. In some cases, the input configuration 372 may include an input number 373a, name 373b, conversion 373c, units 373d, calibration 373e, linearization 373f, and references 373g. The input reference may map the input to the function block variable space 356 resident in the RAM memory. An output configuration 384 may also be provided to configure outputs that may be mapped out of the controller. The output configuration 384 may include an output number 385a, name 385b, conversion 385c, units 385d, calibration 385e, drive type 385f, and references 385g. The output reference may map data from the function block variable space 56 resident in the RAM.

Figure 25:
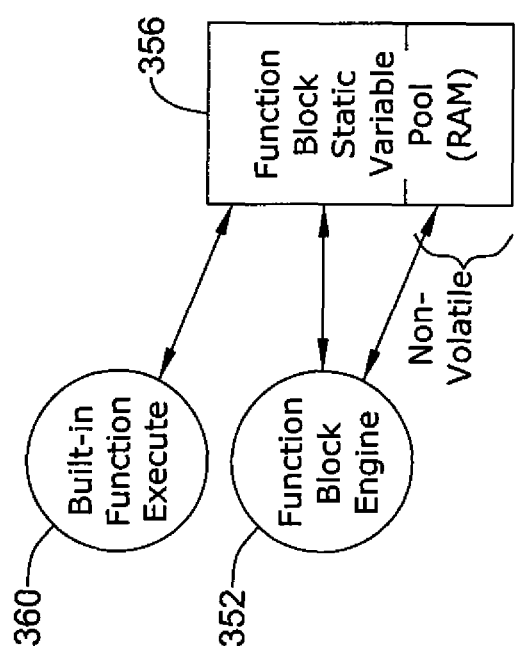
FIG. 25 is a schematic diagram of one or more execution modules of FIG. 23 including a function block engine.

FIG. 25 is a schematic diagram of the illustrative one or more execution modules of FIG. 23 including the function block engine 352. As discussed previously, the function block engine 352 may be resident in the non-volatile memory of the microcontroller, more specifically, in the firmware portion of the non-volatile memory. The function block engine 352 may include one or more programs, such as one or more HVAC application programs. The functional block engine 352 may be a set of sub-routines that can sequentially execute function blocks identified by the block execution list. In some circumstances, the function block engine 352 may execute the function blocks every second in the order provided by the block execution list.

During execution, the function block engine 352 may follow the block execution list of function blocks. This may include reading variables and/or parameters stored in the function block variable pool 356 and/or the loop flash constants 358, as directed by the function blocks and/or block execution list. The function block engine 352 may execute the function blocks from the non-volatile memory, such as FLASH memory, using the data read from the parameters and/or variables. In some cases, the function block engine 352 may also write values or data to the function block variable pool 356. In some cases, these written values are stored only temporarily in the function block variable pool 356 for use in the execution of other function blocks or as outputs of the controller.

The function block engine 352 may allow the application designer to program the controller to perform a wide variety of functions, such as HVAC functions. The function block engine 352 sequentially may execute each function block that the application designer has configured in the block execution list. In some cases, the inputs to the function blocks may be referenced from the function block variable pool 356 that may be resident in RAM. In some cases, there may only be a small stack space in the function block variable pool 356, which could be reused by the function blocks for local, temporary variable storage. Additionally, in some cases, local physical and network inputs may be provided with access to the variable space.

The built-in function configuration and execute block 360 may provide a means of translating inputs (both local and network), and providing the values as variables that can be used as inputs to any or selected function blocks. In other words, in some case, the function blocks may be unaware that an input to a function block came from a physical input, a network input, a parameter, or as an output from another function block. The input from the built-in function execute block 360 may be stored in the function block variable pool 356, in some cases only temporarily, for use by the function block engine 352.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A controller system comprising:
a building environment control platform having a display screen; and
a user interface including a display, the user interface connected to the control platform; and
wherein the user interface is configurable for the control platform; and
the control platform comprises a function block engine including two or more function blocks as the control platform, each function block of the function blocks having a pre-defined function and including one or more parameters and/or variables, wherein the function blocks are unconnected and displayed in a source area, wherein the function blocks are configured to be selected and interconnected to create a variety of different controller programs including different function blocks for controlling a building environment;
the control platform further comprises a block execution list to direct an order of execution of the function blocks by the function block engine and the order is selected via the display screen to create the variety of the controller programs; and
the display screen is configured to display the selected function blocks and the interconnecting of the selected function blocks of at least one of the controller programs of the variety of different controller programs;
wherein the user interface is configurable for the variety of different controller programs and selected function blocks of a controller program populate the user interface for use with the controller program; and
wherein values for control parameters and/or variables of the function blocks of the control program are set by interacting with the populated user interface.

2. The system of claim 1, wherein:
the user interface has a display box that is accessible;
the display box has a first level of one or more icons that displays information about the one or more parameters and/or variables; and
the one or more icons have a second level of one or more icons that provides for selecting and/or adjusting properties of the one or more parameters and/or variables.

3. The system of claim 1, wherein:
the user interface is for providing a display of information specific to the two or more function blocks.

4. The system of claim 3, wherein:
the two or more function blocks have a display box that is accessible;
the display box has a first level of one or more icons that displays information about one or more parameters and/or variables; and
the one or more icons have a second level of one or more icons that provides for selecting and/or adjusting properties of the one or more parameters and/or variables.

5. The system of claim 3, wherein the user interface display provides for at least one variable related to one or more function blocks, an entry of a label, a value field, a number of digits field, a decimal place field and/or a name.

6. The system of claim 1, wherein:
the user interface display has provisions for sequencing through a plurality of display tables, including a category list table, an items table for one or more categories of the category list table, and/or for setting values for items in the items table; and
the plurality of display tables are populated by the selected function blocks of the control program.

7. The system of claim 5, wherein the categories of the category list table can be sequenced through, the items of the categories can be sequenced through, and one or more values for each item may be inserted, incremented, decremented, or not affected, as appropriate.

8. A control system comprising:
a building environment control platform having a display screen, the control platform including a listing of a plurality of unconnected parameters and/or variables that can be individually selected and combined to create a control program; and at least a portion of the listing of a plurality of unconnected parameters and/or variables and individually selected and combined parameters and/or variables are displayed on the display screen; and a user interface connected to the control platform, the user interface having one or more tables with rows and columns displaying information in the rows and columns about selected and combined parameters and/or variables at a first level of the one or more tables; and wherein the control platform further comprises a block execution list to direct an order of execution of the parameters and/or variables and the order is selected via the display screen to create the controller program;

wherein the user interface is configurable for the control platform;

wherein the user interface is configured with a generic menu methodology of the control platform, the generic menu methodology implementing the one or more tables and is configurable for a plurality of different control programs;

wherein the one or more tables of the user interface are populated by combining two or more of the plurality of unconnected parameters and/or variables in the control platform to create the control program; and the user interface provides a selectable and/or adjustable display format for selecting and adjusting values of the various parameters and/or variables of the control platform at a second level of the one or more tables.

9. The system of claim 8, wherein a specific design of the control platform and the user interface is transferable as software to another device to implement the specific design.

10. The system of claim 8, wherein the control platform comprises one or more function blocks of a function block engine, wherein each function block of the function blocks includes one or more of the parameters and/or variables.

11. The system of claim 10, wherein:
at least one or more function blocks are shown as one or more icons on the control platform display; and
the one or more icons are configurable to show one or more of the parameters and/or variables of their respective function blocks.

12. The system of claim 11, wherein the one or more icons are configurable to provide or change a name for the display of one or more parameters and/or variables, to select a type of units that the value of the parameter or variable will be displayed in, and/or to adjust a number of digits indicating a value of the parameter or variable.

13. The system of claim 8, wherein:
the user interface comprises a display having provisions for sequencing through a plurality of display tables, including a category list table, an items table for one or more categories of the category list table, and/or for setting values for items in the items table;
the items represent the various parameters and/or variables; and
the categories of the category list table can be sequenced through, the items of the categories can be sequenced through, and one or more values at each item may be inserted, incremented, decremented, or not affected, as appropriate.

14. The system of claim 8, wherein:
at least one column lists one of category numbers and item numbers; and
a row provides information about an associated listed category number or a listed item number.

\* \* \* \* \*